US011367403B2

(12) United States Patent
Cho et al.

(10) Patent No.: US 11,367,403 B2
(45) Date of Patent: Jun. 21, 2022

(54) DISPLAY APPARATUS THAT PERFORMS LOCAL DIMMING

(71) Applicant: SAMSUNG ELECTRONICS CO., LTD., Suwon-si (KR)

(72) Inventors: Jin Hyun Cho, Suwon-si (KR); Nam Seok Roh, Suwon-si (KR); Sang Hyun Sohn, Suwon-si (KR); Jong Hee Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 16/956,937

(22) PCT Filed: Nov. 8, 2018

(86) PCT No.: PCT/KR2018/013573
§ 371 (c)(1),
(2) Date: Jun. 22, 2020

(87) PCT Pub. No.: WO2019/124734
PCT Pub. Date: Jun. 27, 2019

(65) Prior Publication Data
US 2021/0366410 A1 Nov. 25, 2021

(30) Foreign Application Priority Data
Dec. 22, 2017 (KR) .................. 10-2017-0177797

(51) Int. Cl.
G09G 3/34 (2006.01)
F21V 8/00 (2006.01)
G02F 1/1343 (2006.01)

(52) U.S. Cl.
CPC ............ *G09G 3/342* (2013.01); *G02B 6/005* (2013.01); *G02F 1/134363* (2013.01); *G09G 2320/0686* (2013.01)

(58) Field of Classification Search
CPC .. G09G 3/342; G09G 2320/0686; G09G 3/34; G02B 6/005; G02F 1/134363
See application file for complete search history.

(56) References Cited

U.S. PATENT DOCUMENTS

2010/0171903 A1* 7/2010 Okuyama ............ G02B 6/0041
349/65
2015/0213767 A1* 7/2015 Takagi ................ F21V 23/0457
345/101
(Continued)

FOREIGN PATENT DOCUMENTS

KR 10-2008-0095976 A 10/2008
KR 10-2014-0127695 A 11/2014
(Continued)

OTHER PUBLICATIONS

International Search Report (PCT/ISA/210) dated Mar. 6, 2019 issued by the International Searching Authority in International Application No. PCT/KR2018/013573.

*Primary Examiner* — Roy P Rabindranath
(74) *Attorney, Agent, or Firm* — Sughrue Mion, PLLC

(57) ABSTRACT

A display apparatus includes a plurality of light sources configured to emit light; a light guide plate having a first surface and a second surface, configured to spread light emitted from the plurality of light sources therein to emit light through the first surface; and a local dimming unit configured to reflect or scatter light emitted through the second surface of the light guide plate according to a location. The local dimming unit may include an electro-optical layer configured to change optical properties according to an electric field; a plurality of electrodes located on the same plane, configured to generate the electric field; and a controller configured to change a voltage applied to the plurality of electrodes according to an image.

13 Claims, 18 Drawing Sheets

(56) References Cited

U.S. PATENT DOCUMENTS

| | | | | |
|---|---|---|---|---|
| 2016/0093255 A1* | 3/2016 | Aoki | ................... | G09G 3/3426 |
| | | | | 345/690 |
| 2018/0039128 A1* | 2/2018 | Lee | ..................... | G02B 6/0085 |
| 2018/0292690 A1* | 10/2018 | Kurokawa | ........ | G02F 1/133621 |
| 2018/0308434 A1* | 10/2018 | Nakanishi | ................ | F21S 2/00 |

FOREIGN PATENT DOCUMENTS

| | | | |
|---|---|---|---|
| KR | 10-2016-0033676 A | | 3/2016 |
| KR | 10-2017-0053787 A | | 5/2017 |
| KR | 10-2017-0133691 A | | 12/2017 |

\* cited by examiner

DISPLAY APPARATUS THAT PERFORMS LOCAL DIMMING

TECHNICAL FIELD

The present disclosure relates to a display apparatus, and more particularly, to a display apparatus including an edge-type backlight unit.

BACKGROUND ART

In the related art, display apparatuses refer to output apparatuses displaying visual information converted from received or stored image information to users and have been widely used in various application fields such as individual homes or places of business.

For example, the display apparatuses may be monitor devices connected to personal computers or server computers, portable computer devices, navigation devices, televisions (TVs), Internet Protocol televisions (IPTVs), portable terminals, such as smartphones, tablet personal computers (PCs), personal digital assistants (PDAs), or cellular phones, or various display apparatuses used to play advertisements or movies in the industrial field, or various types of audio/video systems.

Display panels may include pixels arranged in a matrix form and thin film transistors (TFTs) provided in each of the pixels, and may vary the amount of light passing through the pixels or the amount of light emitted from the pixels according to an image signal applied to the thin film transistors. The display apparatus may display an image by adjusting the amount of light emitted from each of the pixels of the display panel.

The display panels displaying the image may include emissive display panels which emit light by themselves according to the image and non-emissive display panels which block or pass light emitted from a separate light source according to the image.

The emissive display panels may typically be a liquid crystal display (LCD) panel. The LCD panel may include a backlight unit that emits light and a liquid crystal panel that blocks or passes light emitted from the backlight unit.

The backlight unit may be divided into a direct-type backlight unit and an edge-type backlight unit according to a location of the light source.

The edge-type backlight unit may include a light guide plate that spreads light and the light source that emits light, and the light may be incident on the light guide plate from the light source located on the side of the light guide plate. The light incident on the light guide plate may move from the side of the light guide plate to the center through total internal reflection inside the light guide plate, and may emit uniform surface light throughout the light guide plate by a pattern located on the front or rear of the light guide plate.

The edge-type backlight unit is generally possible to implement a backlight having a uniform brightness with a thin thickness, and it is possible to implement the backlight using a small number of light sources compared to the direct-type backlight unit.

On the other hand, in implementing local dimming, which varies in brightness according to the location, the edge-type backlight unit has a narrow area capable of realizing local dimming and has difficulty in precisely controlling the local dimming.

DISCLOSURE

Technical Problem

An aspect of the present disclosure is to provide a display apparatus that performs local dimming to improve a contrast ratio of an image.

Another aspect of the present disclosure is to provide a display apparatus that performs local dimming using an optical material that converts optical properties according to an electrical signal.

Another aspect of the present disclosure is to provide a display apparatus that minimizes light loss (luminance loss) due to local dimming.

Technical Solution

An aspect of the disclosure provides a display apparatus including: a plurality of light sources configured to emit light; a light guide plate having a first surface and a second surface, configured to spread light emitted from the plurality of light sources therein and to emit light through the first surface; and a local dimming unit configured to reflect or scatter light emitted through the second surface of the light guide plate according to a location. The local dimming unit may include an electro-optical layer configured to change optical properties according to an electric field; a plurality of electrodes located on the same plane, configured to generate the electric field; and a controller configured to change a voltage applied to the plurality of electrodes according to an image.

When the controller applies a voltage to at least one of a plurality of signal electrodes, the electro-optical layer around the at least one of the plurality of signal electrodes may be configured to pass light.

The light passing through the electro-optical layer may be configured to be spread inside the light guide plate.

When the controller does not apply a voltage to at least one of a plurality of signal electrodes, the electro-optical layer around the at least one of the plurality of signal electrodes may be configured to scatter light.

The light scattered by the electro-optical layer may be emitted through the first surface of the light guide plate.

The plurality of electrodes may include a plurality of common electrodes; and a plurality of signal electrodes configured to receive a voltage signal for generating the electric field.

The controller may be configured to divide the image into a plurality of dimming blocks, to determine a maximum value among luminance values of pixels included in each of the plurality of dimming blocks as the luminance value of each of the plurality of dimming blocks, and to control the voltage applied to the plurality of electrodes based on the luminance value of each of the plurality of dimming blocks.

The plurality of electrodes may include a plurality of common electrodes in the form of a bar and a plurality of signal electrodes in the form of a bar, and wherein the plurality of common electrodes and the plurality of signal electrodes be alternately arranged side by side.

The controller may be configured to control a current supplied to the plurality of light sources based on the maximum value among the luminance values of the dimming blocks located on a path of light emitted from the plurality of light sources.

The controller may be configured to control the voltage applied to the plurality of signal electrodes based on the maximum value among the luminance values of the dimming blocks overlapping each of the plurality of signal electrodes.

The plurality of electrodes may include a plurality of common electrodes in the form of a patch and a plurality of signal electrodes in the form of a patch. The plurality of common electrodes and the plurality of signal electrodes may be alternately arranged in rows and columns.

The controller may be configured to control the voltage applied to the plurality of signal electrodes based on the maximum value among the luminance values of the dimming blocks overlapping each of the plurality of signal electrodes.

The plurality of electrodes may be configured to reflect light passing through the electro-optical layer.

The electro-optical layer may be configured to change a scattering rate depending on the presence of the electric field.

The electro-optical layer may be configured to pass light when the electric field is present, and to scatter the light when the electric field is not present.

Another aspect of the disclosure provides a control method of a display apparatus comprising a plurality of light sources, a light guide plate, and a local dimming unit, the method including: dividing an image into a plurality of dimming blocks; determining a maximum value among luminance values of pixels included in each of the plurality of dimming blocks as the luminance value of each of the plurality of dimming blocks; and applying a voltage to the local dimming unit based on the luminance value of each of the plurality of dimming blocks. The local dimming unit may include an electro-optical layer configured to change optical properties according to an electric field; and a plurality of electrodes located on the same plane, configured to generate the electric field.

The method may further include controlling the voltage applied to a plurality of signal electrodes based on the maximum value among the luminance values of the dimming blocks overlapping each of the plurality of signal electrodes.

The method may further include controlling a current supplied to the plurality of light sources based on the maximum value among the luminance values of the dimming blocks located on a path of light emitted from the plurality of light sources.

When the voltage is applied to at least one of the plurality of signal electrodes, the electro-optical layer around the at least one of the plurality of signal electrodes may be configured to pass light.

When the voltage is not applied to at least one of the plurality of signal electrodes, the electro-optical layer around the at least one of the plurality of signal electrodes may be configured to scatter light.

Advantageous Effects

According to an aspect of an embodiment, it is possible to provide a display apparatus that performs local dimming to improve a contrast ratio of an image.

According to another aspect of an embodiment, it is possible to provide a display apparatus that performs local dimming using an optical material that converts optical properties according to an electrical signal.

According to another aspect of an embodiment, it is possible to provide a display apparatus that minimizes light loss (luminance loss) due to local dimming.

MODES OF THE INVENTION

Figure 1:
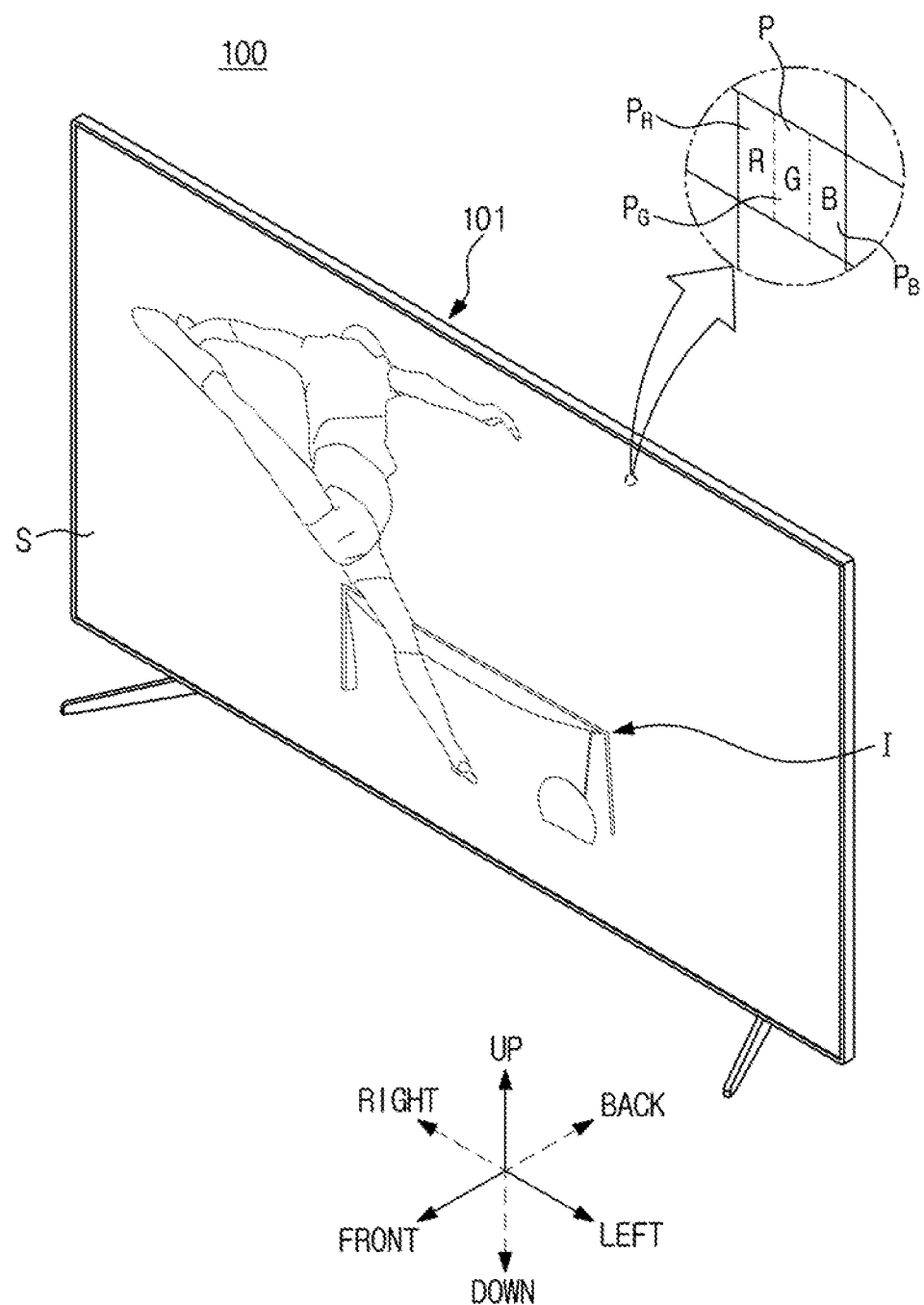
FIG. 1 is a view illustrating an appearance of a display apparatus according to an embodiment.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

Further, when it is stated that a layer is "on" another layer or substrate, the layer may be directly on another layer or substrate or a third layer may be disposed therebetween.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

FIG. 1 is a view illustrating an appearance of a display apparatus according to an embodiment.

A display apparatus 100 is an apparatus capable of processing an image signal received from the outside (e.g., external image source) and visually displaying the processed image. As illustrated in FIG. 1, the display apparatus 100 may be implemented as a TV, but the embodiment of the display apparatus 100 is not limited thereto. For example, the display apparatus 100 may be implemented as a monitor of a computer, or may be included in a navigation terminal device or various portable terminal devices. Here, the portable terminal devices may be a desktop computer, a laptop computer, a smartphone, a tablet personal computer (PC), a wearable computing device, or a personal digital assistant (PDA).

In addition, the display apparatus 100 may be a large format display (LFD) installed outdoors such as on a building roof or at a bus stop. The outdoors is not necessarily limited to the outside, but should be understood as a concept including a place where a large number of people can go in and out, even an area such as a subway station, a shopping mall, a movie theater, a company, a store, etc.

The display apparatus 100 may receive a video signal and an audio signal from various content sources, and may output video and audio corresponding to the video signal and the audio signal. For example, the display apparatus 100 may receive television broadcast content through a broadcast receiving antenna or a cable, receive content from a content reproduction device, or receive the content from a content providing server of a content provider.

As illustrated in FIG. 1, the display apparatus 100 may include a main body 101 accommodating a plurality of components for displaying an image I and a screen S provided on one surface of the main body 101 to display the image I.

The main body 101 may form an appearance of the display apparatus 100 and the component for displaying the image I by the display apparatus 100 may be provided in the inside of the main body 101. The main body 101 illustrated in FIG. 1 may be in the form of a flat plate, but the shape of the main body 101 is not limited to that illustrated in FIG. 1. For example, the main body 101 may have a shape in which left and right ends protrude forward and a center part is curved so as to be concave.

The screen S may be formed on the front surface of the main body 101, and the screen S may display the image I as visual information. For example, a still image or a moving image may be displayed on the screen S, and a two-dimensional plane image or a three-dimensional stereoscopic image may be displayed.

A plurality of pixels P may be formed on the screen S, and the image I displayed on the screen S may be formed by a combination of light emitted from the plurality of pixels P. For example, the single image I may be formed on the screen S by combining the light emitted by the plurality of pixels P with a mosaic.

Each of the plurality of pixels P may emit light of various brightness and various colors.

Each of the plurality of pixels P may include a configuration (for example, an organic light emitting diode) capable of emitting the light directly in order to emit the light of various brightness, or a configuration (for example, a liquid crystal panel) capable of transmitting or blocking the light emitted by a backlight unit or the like.

In order to emit the light of various colors, each of the plurality of pixels P may include subpixels $P_R$, $P_G$, and $P_B$.

The subpixels $P_R$, $P_G$, and $P_B$ may emit light. The red subpixel $P_R$ may emit red light, the green subpixel $P_G$ may emit green light, and the blue subpixel $P_B$ may emit blue light. For example, red light may represent light from approximately 620 nm (nanometer) to 750 nm in wavelength, green light may represent light from approximately 495 nm to 570 nm, and blue light may represent light from approximately 450 nm to 495 nm.

By the combination of the red light of the red subpixel $P_R$, the green light of the green subpixel $P_G$, and the blue light of the blue subpixel $P_B$, each of the plurality of pixels P may emit the light of various brightness and various colors.

The screen S may be provided in the flat plate shape as illustrated in FIG. 1. However, the shape of the screen S is not limited to that illustrated in FIG. 1. It may be provided in a shape in which both ends protrude forward and a center portion is curved so as to be concave according to the shape of the main body 101.

The display apparatus 100 may include various types of display panels for displaying the image. For example, the display apparatus 100 may include a liquid crystal display (LCD) panel, a light emitting diode (LED) panel, or an organic light emitting diode (OLED) panel.

Hereinafter, the display apparatus 100 including the liquid crystal display (LCD) panel is described as an example of the display apparatus 100.

Figure 2:
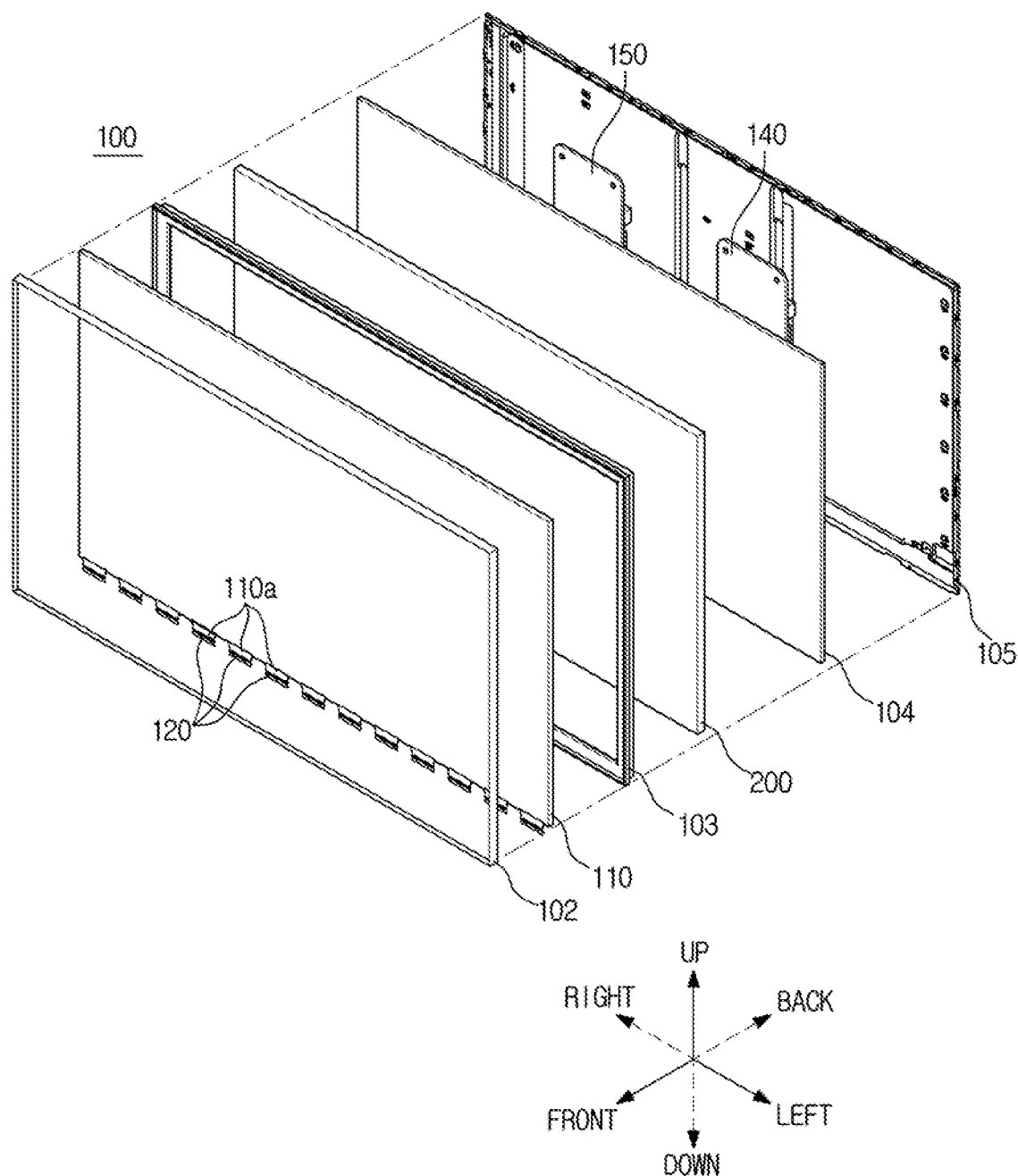
FIG. 2 is an exploded view illustrating a display apparatus according to an embodiment.
Figure 3:
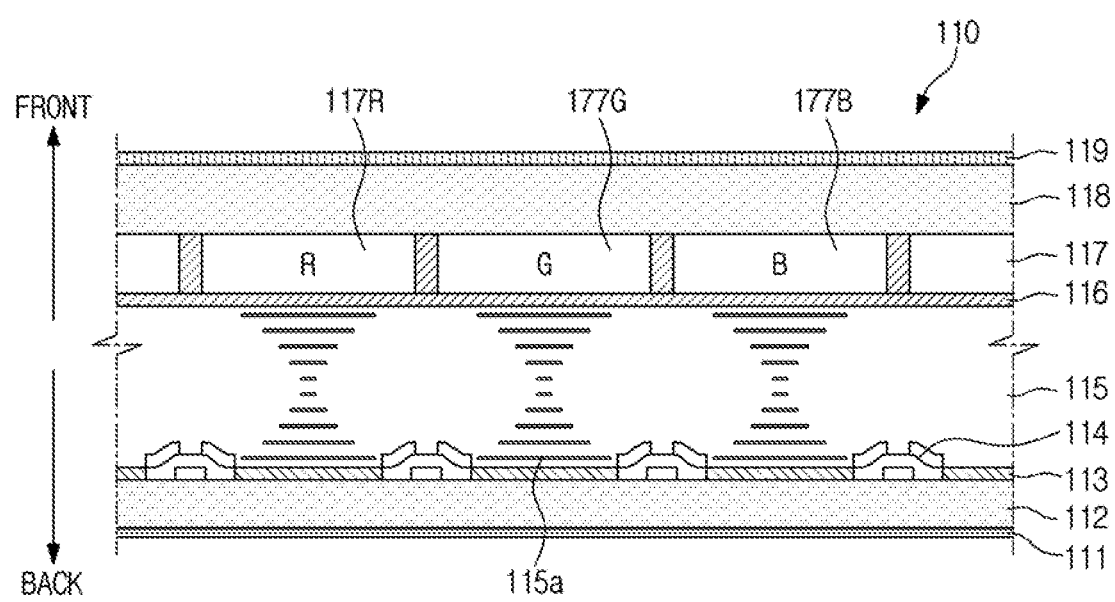
FIG. 3 is a view illustrating an example of a liquid crystal panel included in a display apparatus according to an embodiment.

FIG. 2 is an exploded view illustrating a display apparatus according to an embodiment. FIG. 3 is a view illustrating an example of a liquid crystal panel included in a display apparatus according to an embodiment.

As illustrated in FIG. 2, various components for generating the image I on the screen S may be provided in the main body 101.

For example, the main body 101 may include a backlight unit 200 configured to emit a surface light forward, a liquid crystal panel 110 configured to block or pass light emitted from the backlight unit 200, a control assembly 140 configured to control operations of the backlight unit 200 and the liquid crystal panel 110, and a power assembly 150 configured to supply power to the backlight unit 200 and the liquid crystal panel 110. The main body 101 may further include a bezel 102, a frame middle mold 103, a bottom chassis 104, and a rear cover 105 for supporting and fixing the liquid crystal panel 110, the backlight unit 200, the control assembly 140, and the power assembly 150.

The backlight unit 200 may include a point light source for emitting monochromatic light or white light and may refract, reflect, and scatter the light to convert the light emitted from the point light source into a uniform surface light. For example, the backlight unit 200 may include a light source for emitting the monochromatic light or the white light, a light guide plate for spreading the light incident from the light source, a reflective sheet for reflecting the light emitted from a rear surface of the light guide plate, and an optical sheet for refracting and scattering the light emitted from the front surface of the light guide plate.

As such, the backlight unit 200 may emit a uniform surface light source toward the front by refracting, reflecting, and scattering the light emitted from the light source.

A configuration and operation of the backlight unit 200 is described in more detail below.

The liquid crystal panel 110 may be provided in front of the backlight unit 200 and configured to block or transmit the light emitted from the backlight unit 200 in order to form the image I.

The front surface of the liquid crystal panel 110 may form a screen 3 of the display apparatus 100 described above and may be composed of the plurality of pixels P. The plurality of pixels P included in the liquid crystal panel 110 may independently block or transmit the light of the backlight unit 200. The light transmitted by the plurality of pixels P may form the image I to be displayed on the screen S.

Referring to FIG. 3, the liquid crystal panel 110 may include a first polarizing film 111, a first transparent substrate 112, a pixel electrode 113, a thin film transistor 114, a liquid crystal layer 115, a common electrode 116, a color filter 117, a second transparent substrate 118, and a second polarizing film 119.

The first transparent substrate 112 and the second transparent substrate 118 may support the pixel electrode 113, the thin film transistor 114, the liquid crystal layer 115, the common electrode 116, and the color filter 117 in a fixed manner. The first and second transparent substrates 112 and 118 may be composed of tempered glass or transparent resin.

The first polarizing film 111 and the second polarizing film 119 may be provided on the outer sides of the first and second transparent substrates 112 and 118.

The first polarizing film 111 and the second polarizing film 119 may transmit a specific light and block a different light, respectively.

The light may be a pair of an electric field and a magnetic field that oscillate in a direction perpendicular to a proceeding direction. The electric field and the magnetic field constituting the light may oscillate in all directions perpendicular to the proceeding direction of light, and the oscillation direction of the electric field and the oscillation direction of the magnetic field may be perpendicular to each other.

For example, the first polarizing film 111 may transmit the light having the magnetic field oscillating in a first direction and block other light. Further, the second polarizing film 119 may transmit the light having the magnetic field oscillating in a second direction and block other light. At this time, the first direction and the second direction may be perpendicular to each other. In other words, a polarizing direction of the light transmitted by the first polarizing film 111 and an oscillating direction of the light transmitted by the second polarizing film 119 may be perpendicular to each other. As a result, the light may not pass through the first polarizing film 111 and the second polarizing film 119 at the same time.

The color filter 117 may be provided in the inside of the second transparent substrate 118.

The color filter 117 may include a red filter 117R for transmitting a red light, a green filter 117G for transmitting a green light, and a blue filter 117B for transmitting a blue light. The red filter 117R, the green filter 117G, and the blue filter 117B may be arranged side by side.

A region in which the color filter 117 is formed may correspond to the pixel P described above. In addition, a region in which the red filter 117R is formed may correspond to the red subpixel $P_R$, a region in which the green filter 117G is formed may correspond to the green subpixel $P_G$, and a region in which the blue filter 117B is formed may correspond to the blue subpixel $P_B$.

The thin film transistor (TFT) 114 may be provided in the inside of the first transparent substrate 112. For example, the thin film transistor 114 may be provided at a location corresponding to a boundary between the red filter 117R, the green filter 117G, and the blue filter 117B.

The thin film transistor 114 may transmit or block a current flowing to the pixel electrode 113 described below. For example, an electric field may be formed or removed between the pixel electrode 113 and the common electrode 116 according to the turning on (closing) or turning off (opening) of the thin film transistor 114.

The thin film transistor 114 may be formed of poly-silicon or may be formed by a semiconductor process such as lithography, deposition, or ion implantation.

The pixel electrode 113 may be provided in the inside of the first transparent substrate 112 and the common electrode 116 may be provided in the inside of the second transparent substrate 118.

The pixel electrode 113 and the common electrode 116 may be composed of a conductive metal which electricity is conducted and may generate an electric field for changing the arrangement of liquid crystal molecules 115a constituting the liquid crystal layer 115 to be described below.

The pixel electrode 113 may be formed separately in regions corresponding to the red filter 117R, the green filter 117G, and the blue filter 117B, and the common electrode 116 may be extended from one side of the liquid crystal panel 110 to the other side. In other words, a plurality of the pixel electrodes 113 disposed in the same row may share one of the common electrodes 116. As a result, an electric field may be selectively formed in the liquid crystal layer 115 according to a location of the pixel electrode 113.

The pixel electrode 113 and the common electrode 116 are composed of a transparent material and may transmit the light incident from the outside. For example, the pixel electrode 113 and the common electrode 116 may be composed of indium tin oxide (ITO), indium zinc oxide (IZO), silver nano wire, carbon nano tube (CNT), graphene, or PEDOT (3,4-ethylenedioxythiophene).

The liquid crystal layer 115 may be formed between the pixel electrode 113 and the common electrode 116, and the liquid crystal layer 115 may be filled with the liquid crystal molecules 115a.

A liquid crystal may represent an intermediate state between a solid (crystal) and a liquid. In general, when a solid material is heated, the state may change from a solid state to a transparent liquid state at the melting temperature. On the other hand, when heat is applied to a liquid crystal material in the solid state, the liquid crystal material may change to the transparent liquid state after being changed into an opaque and turbid liquid at the melting temperature. Most of these liquid crystal materials are organic compounds, and their molecular shapes have a long and narrow rod shape. The arrangement of molecules is the same as an irregular state in any direction, but may have a regular crystal form in the opposite direction. As a result, the liquid crystal has both the fluidity of liquid and the optical anisotropy of crystal (solid).

The liquid crystal may also exhibit optical properties according to the change of the electric field. For example, the direction of the molecular arrangement of the liquid crystal may change according to the change of the electric field.

When an electric field is generated in the liquid crystal layer 115, the liquid crystal molecules 115a of the liquid crystal layer 115 may be arranged in the direction of the electric field. When no electric field is generated in the liquid crystal layer 115, the liquid crystal molecules 115a may be irregularly arranged or disposed along an alignment film (not shown).

As a result, the optical properties of the liquid crystal layer 115 may change according to the presence or absence of an electric field passing through the liquid crystal layer 115.

For example, in a case of a Twisted Nematic (TN) liquid crystal panel, the liquid crystal molecules 115a may be disposed in a spiral shape. When an electric field is not formed in the liquid crystal layer 115, light may pass through the liquid crystal panel 110 due to the arrangement of the liquid crystal molecules 115a of the liquid crystal layer 115. On the other hand, when an electric field is formed in the liquid crystal layer 115, the liquid crystal molecules 115a may be vertically disposed with respect to the transparent substrates 112 and 118, and light may not pass through the liquid crystal panel 110.

As another example, in a case of a Vertical Alignment (VA) liquid crystal panel, the liquid crystal molecules 115a may be disposed perpendicularly to the transparent substrates 112 and 118. When an electric field is not formed in the liquid crystal layer 115, light may not pass through the liquid crystal panel 110 due to the arrangement of the liquid crystal molecules 115a of the liquid crystal layer 115. In addition, when an electric field is formed in the liquid crystal layer 115, the liquid crystal molecules 115a may be disposed in parallel with the transparent substrates 112 and 118, and light may pass through the liquid crystal panel 110.

As another example, in a case of an In-Plane-Switching (IPS) liquid crystal panel, the liquid crystal molecules 115a may be horizontally disposed with the transparent substrates 112 and 118. In the case of the IPS liquid crystal display, both the pixel electrode 113 and the common electrode 116 may be provided on the first transparent substrate 112, and an electric field in a direction parallel to the transparent substrates 112 and 118 may be formed in the liquid crystal layer 115. Depending on whether an electric field is formed in the liquid crystal layer 115, light may pass through the liquid crystal panel 110 or be blocked by the liquid crystal panel 110.

On one side of the liquid crystal panel 110, a cable 110a for transmitting image data to the liquid crystal panel 110, and a display driver integrated circuit (DDI) 120 (hereinafter referred to as 'driver IC') for processing digital image data and outputting an analog image signal may be provided.

The cable 110a may electrically connect between the control assembly 140, the power assembly 150 and the driver IC 120, and may also electrically connect between the driver IC 120 and the liquid crystal panel 110. The cable 110a may include a flexible flat cable or a film cable that can be bent.

The driver IC 120 may receive the image data and power from the control assembly 140 and the power assembly 150 through the cable 110a, and may supply the image signal and a driving current to the liquid crystal panel 110 through the cable 110a.

The cable 110a and the driver IC 120 may be integrally implemented as a film cable, a chip on film (COF), a tape carrier packet (TCP), or the like. In other words, the driver IC 120 may be disposed on the cable 110a. However, the present disclosure is not limited thereto, and the driver IC 120 may be disposed on the liquid crystal panel 110 or the control assembly 140.

The control assembly 140 may include a control circuit that controls the operation of the liquid crystal panel 110. The control circuit may process the image data received from an external content source, transmit the image data to the liquid crystal panel 110, and transmit dimming data to the backlight unit 200.

The power assembly 150 may supply the power to the liquid crystal panel 110 and the backlight unit 200 such that the backlight unit 200 outputs surface light and the liquid crystal panel 110 blocks or passes the light from the backlight unit 200.

The control assembly 140 and the power assembly 150 may be implemented with a printed circuit board and various circuits mounted on the printed circuit board. For example, the printed circuit board may include a capacitor, a coil, a resistance element, a microprocessor, and the like, and a power supply circuit board on which they are mounted. Further, the control circuit may include a memory, the microprocessor, and a control circuit board on which they are mounted.

The backlight unit 200 is described below.

Figure 4:
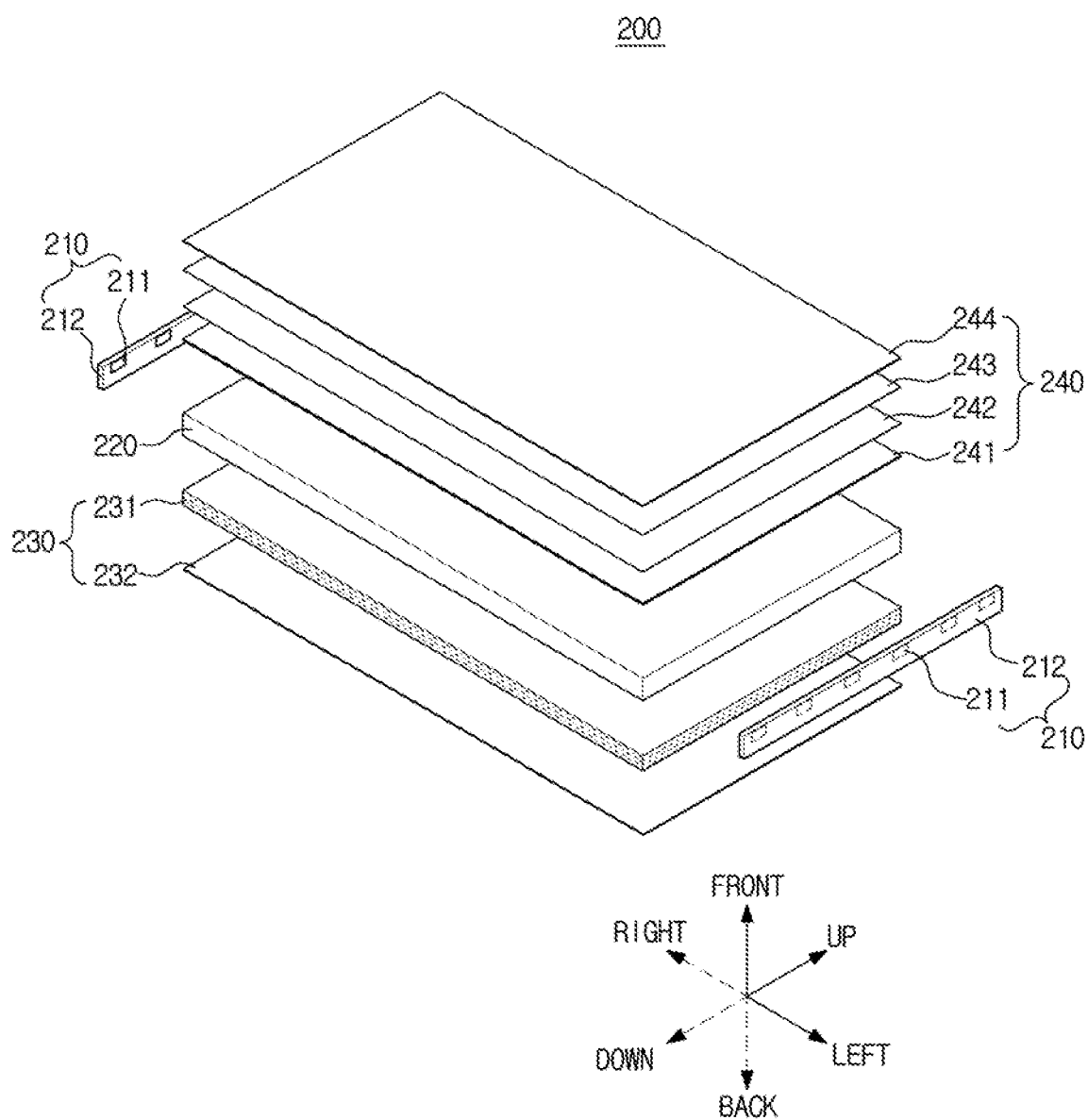
FIG. 4 is an exploded view illustrating a backlight unit according to an embodiment.
Figure 5:
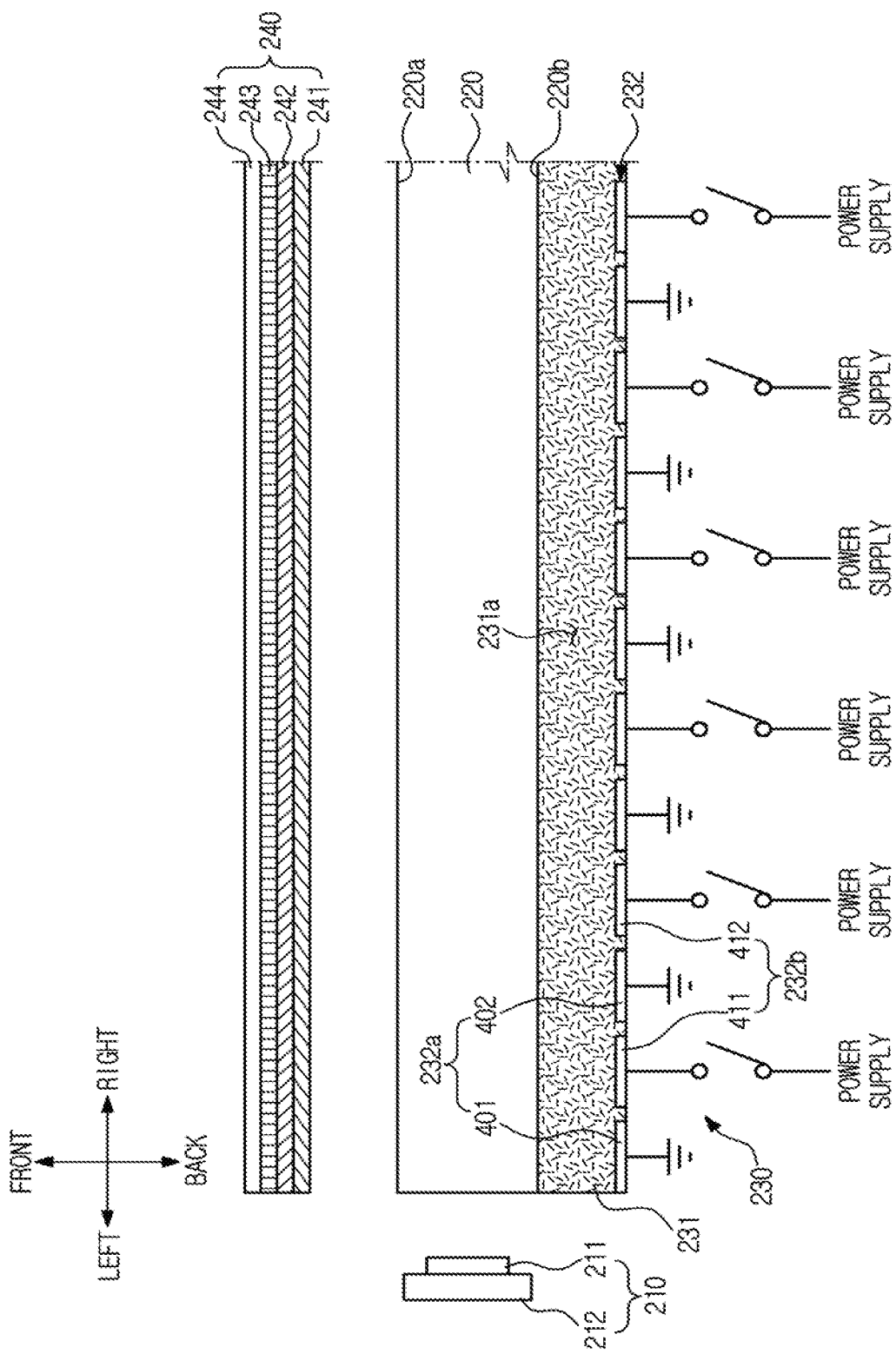
FIG. 5 is a view illustrating a side cross-section of a backlight unit according to an embodiment.

FIG. 4 is an exploded view illustrating a backlight unit according to an embodiment. FIG. 5 is a view illustrating a side cross-section of a backlight unit according to an embodiment.

As illustrated in FIGS. 4 and 5, the backlight unit 200 may include a light emitting module 210 for emitting light, a light guide plate 220 for spreading light, a local dimming unit 230 for selectively refracting and/or reflecting light, and an optical sheet 240 for improving luminance of light.

The light emitting module 210 may include a plurality of light sources 211 emitting light and a supporter 212 supporting the plurality of light sources 211.

The plurality of light sources 211 may be disposed on the side of the light guide plate 220, and may emit light toward the center of the light guide plate 220. The plurality of light sources 211 may be disposed at equal intervals so that light incident on the light guide plate 220 has a uniform brightness. For example, as illustrated in FIG. 4, the plurality of light sources 211 may be disposed at equal intervals on the left and right sides of the light guide plate 220, respectively. However, the arrangement of the plurality of light sources 211 is not limited to that illustrated in FIG. 4. For example, the plurality of light sources 211 may be disposed on the upper and lower sides of the light guide plate 220 or may be disposed on either the left or right side of the light guide plate 220.

Each of the plurality of light sources 211 may emit the monochromatic light (light having a specific wavelength, for example, blue light) or emit the white light (light mixed with light having various wavelengths, for example, light mixed with red light, green light, and blue light). For example, each of the plurality of light sources 211 may employ a light emitting diode (LED) or a cold cathode tube (CCFL) having a small amount of heat.

The supporter 212 may fix the plurality of light sources 211 so that the locations of the plurality of light sources 211 are not changed. In addition, power may be supplied to the plurality of light sources 211 through the supporter 212.

The supporter 212 may be disposed on the side of the light guide plate 220 with the plurality of light sources 211. For example, as illustrated in FIG. 4, the supporter 212 may be disposed on the left side of the light guide plate 220. However, the arrangement of the supporter 212 is not limited to that illustrated in FIG. 4. For example, the supporter 212 may be disposed on the upper and lower sides of the light guide plate 220 or may be disposed on either the left or right side of the light guide plate 220.

The supporter 212 may be made of a synthetic resin comprising a conductive power supply line for fixing the plurality of light sources 211 and supplying power to the plurality of light sources 211, or a printed circuit board (PCB).

The light guide plate 220 may change the proceeding direction of the light emitted from the plurality of light sources 211 disposed on the side, and emit light toward the front. In particular, the light emitted from the plurality of light sources 211 may be spread from an edge portion of the light guide plate 220 to a center portion of the light guide plate 220, and as a result, the light guide plate 220 may emit uniform light toward the front.

A pattern for improving straightness of light emitted from the plurality of light sources 211 may be formed on a front surface 220a of the light guide plate 220. The pattern formed on the front surface 220a of the light guide plate 220 may allow the light emitted from the plurality of light sources 211 to go straight in the emitted direction. For example, on the front surface 220a of the light guide plate 220, a lenticular lens may be formed in a direction in which light is emitted from the plurality of light sources 211, and the light emitted from the plurality of light sources 211 by the lenticular lens may go straight toward a central portion of the light guide plate 220.

The light incident into the light guide plate 220 may proceed in various directions according to an incident angle. For example, the light incident toward the front of the light guide plate 220 may be totally internally reflected at the front surface 220a of the light guide plate 220 and proceed toward the central portion of the light guide plate 220. In addition, the light incident toward the rear of the light guide plate 220 may be reflected by the local dimming unit 230 provided at the rear of the light guide plate 220 and proceed toward the central portion of the light guide plate 220, or may be refracted (or scattered) by the local dimming unit 230 and emitted through the front surface 220a of the light guide plate 220.

The light by the total internal reflection at the front surface 220a of the light guide plate 220 and the reflection from the local dimming unit 230 may proceed from the edge portion of the light guide plate 220 to the central portion of the light guide plate 220. In addition, the light may be emitted to the front of the light guide plate 220 through the front surface 220a of the light guide plate 220 by refraction (or scattering) in the local dimming unit 230.

The light guide plate 220 may be composed of poly methyl methacrylate (PMMA) or transparent polycarbonate (PC).

The optical sheet 240 may include various sheets for improving the luminance of light emitted through the front surface 220a of the light guide plate 220 or improving the uniformity of luminance. For example, the optical sheet 240 may include a diffusion sheet 241, a first prism sheet 242, a second prism sheet 243, and a reflective polarizing sheet 244.

The diffusion sheet 241 may spread light to improve the uniformity of luminance of light emitted through the front surface 220a of the light guide plate 220. The light emitted from the plurality of light sources 211 may be spread in the light guide plate 220 and may be spread again by the diffusion sheet 241.

Due to the spread in the diffusion sheet 241, the light may be emitted from the diffusion sheet 241 obliquely. In other words, an exit angle indicating an angle between the light emitted from the diffusion sheet 241 and a normal direction of the diffusion sheet 241 may be greater that an incident angle indicating the angle between the light incident on the diffusion sheet 241 and the normal direction of the diffusion sheet 241.

The first and second prism sheets 242 and 243 may concentrate the light emitted from the diffusion sheet 241. In other words, the first and second prism sheets 242 and 243 may refract the light emitted from the diffusion sheet 241 such that the light emitted obliquely from the diffusion sheet 241 proceeds toward the front.

The first and second prism sheets 242 and 243 may include a prism pattern having a triangular prism shape, and a plurality of the prism patterns may be arranged adjacent to each other to form a plurality of band shapes. At this time, a direction in which the prism patterns of the first prism sheet 242 are arranged and a direction in which the prism patterns of the second prism sheet 243 are arranged may be perpendicular to each other. The light passing through the first and second prism sheets 242 and 243 may have a viewing angle of approximately 70 degrees and proceed toward the front of the backlight unit 200, and the luminance may also be improved.

The reflective polarizing sheet 244 may be a type of polarizing film, and may pass some of the incident light and reflect other portions. For example, light polarized in the same direction as a predetermined polarization direction of the reflective polarizing sheet 244 may be passed, and light polarized in a direction different from the polarization direction of the reflective polarizing sheet 244 may be reflected.

At this time, the polarization direction of the reflective polarizing sheet 244 may be the same as the polarization direction of the first polarizing film 111 included in the liquid crystal panel 110 described above. As a result, the light passing through the reflective polarizing sheet 244 may also pass through the first polarizing film 111 included in the liquid crystal panel 110.

In addition, the light reflected by the reflective polarizing sheet 244 may be recycled inside the backlight unit 200, and the brightness of the backlight unit 200 may be improved by the light recycling.

The configuration included in the optical sheet 240 is not limited to the sheet or film described above, and may include more various sheets or films, such as a protective sheet. In addition, a stacking order of the diffusion sheet 241, the first prism sheet 242, the second prism sheet 243, and the reflective polarizing sheet 244 is not limited to that illustrated in FIG. 4, and the diffusion sheet 241, the first prism sheet 242, the second prism sheet 243, and the reflective polarizing sheet 244 may be stacked in various order.

The local dimming unit 230 may include an electro-optical layer 231 whose optical properties change according to an electric field, and a plurality of electrodes 232 for forming an electric field in the electro-optical layer 231.

The electro-optical layer 231 may be located on a rear surface 220b of the light guide plate 220 and may be composed of an electro-optical material 231a. The electro-optical material 231a may exhibit an electro-optic effect. The electro-optic effect may refer to a phenomenon in which the optical properties change according to an electric field. Particularly, the electro-optic effect may refer to a phenomenon in which a refractive index, phase retardation, a polarization characteristics, etc. of a material change depending on the presence of the electric field and/or an intensity of the electric field.

The liquid crystal may correspond to the representative electro-optical material 231a. The liquid crystal may change the refractive index and the polarization characteristics depending on the presence of the electric field and/or the intensity of the electric field. For example, polymer dispersed liquid crystal (PDLC), polymer network liquid crystal (PNLC), cholesteric liquid crystal (Cholesteric Liquid Crystal), smectic liquid crystal (Smectic Liquid Crystal), and the like may be used as the electro-optical material 231a.

An electro-chromic material may also correspond to the electro-optical material 231a. The electro-chromic material may refer to a material whose color changes reversibly according to an oxidation-reduction reaction by application of a voltage. For example, tungsten oxide (WO3) may be reduced due to electron injection, and the color may change from colorless to blue.

An electrowetting material may also correspond to the electro-optical material 231a. Electrowetting may refer to changing a surface tension of liquid using electricity. For example, water droplets agglomerate by surface tension. When the electricity is supplied to the water droplets, an attraction force between the water droplets and a bottom surface increases, so that the water droplets spread over the bottom surface and the refractive index of the water droplets may be changed.

As described above, the electro-optical material 231a of the electro-optical layer 231 may have optical characteristics that change depending on the presence of the electric field and/or the intensity of the electric field.

For example, when an electric field is generated in the electro-optical layer 231, the electro-optical material 231a may refract the incident light equally. In other words, the light incident on the electro-optical layer 231 may be refracted at the same refractive index regardless of the location where the light is incident, and may be refracted in the same direction regardless of the location where the light is incident. Therefore, when an electric field is generated in the electro-optical layer 231, the electro-optical layer 231 may be transparent. In other words, the electro-optical layer 231 may pass the incident light.

When an electric field is not generated in the electro-optical layer 231, the electro-optical material 231a may refract the incident light in different directions with different refractive indices depending on the location. In other words, the light incident on the electro-optical layer 231 may be refracted by different refractive indices depending on the location where the light is incident, and may be refracted in different directions according to the location where the light is incident. Therefore, when an electric field is not generated in the electro-optical layer 231, the electro-optical layer 231 may be opaque. In other words, the electro-optical layer 231 may scatter the incident light.

As another example, when an electric field is generated in the electro-optical layer 231, the electro-optical material 231a may refract the incident light in different directions with different refractive indices depending on the location. When an electric field is not generated in the electro-optical layer 231, the electro-optical material 231a may refract the incident light equally.

As such, the electro-optical layer 231 may have the refractive index or the refractive direction changed according to the presence of the electric field and/or the strength of the electric field.

However, it is not limited to this, and the electro-optical layer 231 is sufficient if the optical properties are changed according to the presence of the electric field and/or the intensity of the electric field. For example, a phase delay or polarization direction of the electro-optical layer 231 may be changed according to the presence of the electric field and/or the intensity of the electric field.

The plurality of electrodes 232 may be provided opposite the light guide plate 220 around the electro-optical layer 231. The electro-optical material 231a may be filled between the plurality of electrodes 232 and the light guide plate 220, and the electro-optical layer 231 may be formed between the plurality of electrodes 232 and the light guide plate 220.

The plurality of electrodes 232 may be located on the same plane as illustrated in FIG. 5. The plurality of electrodes 232 may not be provided between the light guide plate 220 and the electro-optical layer 231, and all of the plurality of electrodes 232 may be provided opposite the light guide plate 220 around the electro-optical layer 231.

The plurality of electrodes 232 may control the electric field in the electro-optical layer 231. The plurality of electrodes 232 may include common electrodes 232a and signal electrodes 232b. The common electrodes 232a and the signal electrodes 232b may be arranged side by side on the same plane, and may also be alternately disposed on the same plane.

The common electrodes 232a may be connected to ground or may be connected to each other. The common electrodes 232a may output a reference potential (e.g., '0V') to the signal electrodes 232b.

The signal electrodes 232b may receive a voltage for generating an electric field. When the voltage is applied to the signal electrodes 232b, an electric field may be formed between the signal electrodes 232b to which the voltage is applied and the peripheral common electrodes 232a.

For example, as illustrated in FIG. 5, the plurality of electrodes 232 may include a first common electrode 401, a first signal electrode 411, a second common electrode 402, and a second signal electrode 412 disposed side by side with each other. The first common electrode 401, the first signal electrode 411, the second common electrode 402, and the second signal electrode 412 may be provided on the surface of the electro-optical layer 231. In addition, the first common electrode 401 and the second common electrode 402 may be disposed on both sides of the first signal electrode 411. When a voltage is applied to the first signal electrode 411, an electric field may be formed between the first signal electrode 411 and the first common electrode 401, and an electric field may be formed between the first signal electrode 411 and the second common electrode 402.

The plurality of electrodes 232 may reflect light with a high reflectance. When the electro-optical layer 231 becomes transparent, the light may be incident from the light guide plate 220 to the electro-optical layer 231, and may pass through the transparent electro-optical layer 231. The plurality of electrodes 232 may reflect the light passing through the electro-optical layer 231 with high reflectance.

In other words, when the electro-optical layer 231 becomes transparent, the plurality of electrodes 232 may reflect the light emitted through the rear surface 220b of the light guide plate 220 to the light guide plate 220.

The common electrodes 232a and the signal electrodes 232b may be made of a conductive material capable of passing electricity, and the surfaces of the common electrodes 232a and the signal electrodes 232b may be made of a material having high reflectance to light.

For example, the common electrodes 232a and the signal electrodes 232b may be made of silver (Ag) or may be made of metal such as copper or aluminum coated with silver (Ag). Further, the common electrodes 232a and the signal electrodes 232b may be manufactured by coating a polymer having high reflectivity on a base material having electrical conductivity.

As described above, the electro-optical layer 231 may pass light (refraction in one direction) or scatter light (refraction in multiple directions) depending on whether an electric field is generated, and the plurality of electrodes 232 generating an electric field in the electro-optical layer 231 may have a high light reflectance.

For example, when an electric field is generated in the electro-optical layer 231 by the plurality of electrodes 232, the light emitted through the rear surface 220b of the light guide plate 220 may pass through the electro-optical layer 231 and may be reflected by the plurality of electrodes 232 and may be incident on the light guide plate 220. In addition, when an electric field is not generated in the electro-optical layer 231 by the plurality of electrodes 232, the light emitted through the rear surface 220b of the light guide plate 220 may be scattered in the electro-optical layer 231, and a part of the light may pass through the light guide plate 220 and be emitted through the front surface 220a of the light guide plate 220.

In other words, the light may be emitted through the front surface 220a of the light guide plate 220 at a location corresponding to an opaque portion of the electro-optical layer 231, and the backlight unit 200 may emit bright light at a location corresponding to the opaque portion of the electro-optical layer 231 compared to other locations.

Hereinafter, the operation of the backlight unit 200 including the local dimming unit 230 will be described in more detail.

Figure 6:
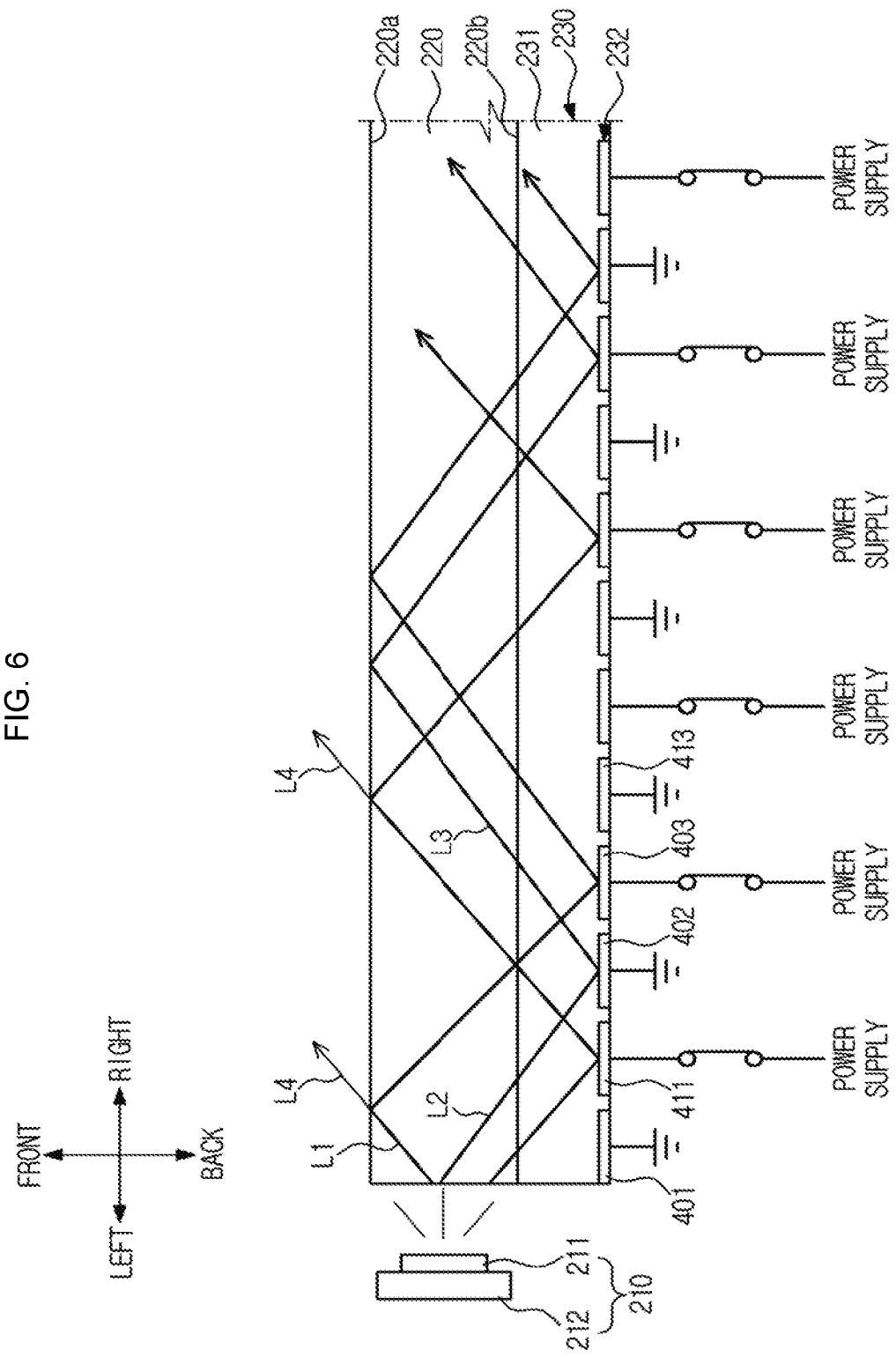
FIG. 6 is a view illustrating an example of an operation of a backlight unit according to an embodiment.
Figure 7:
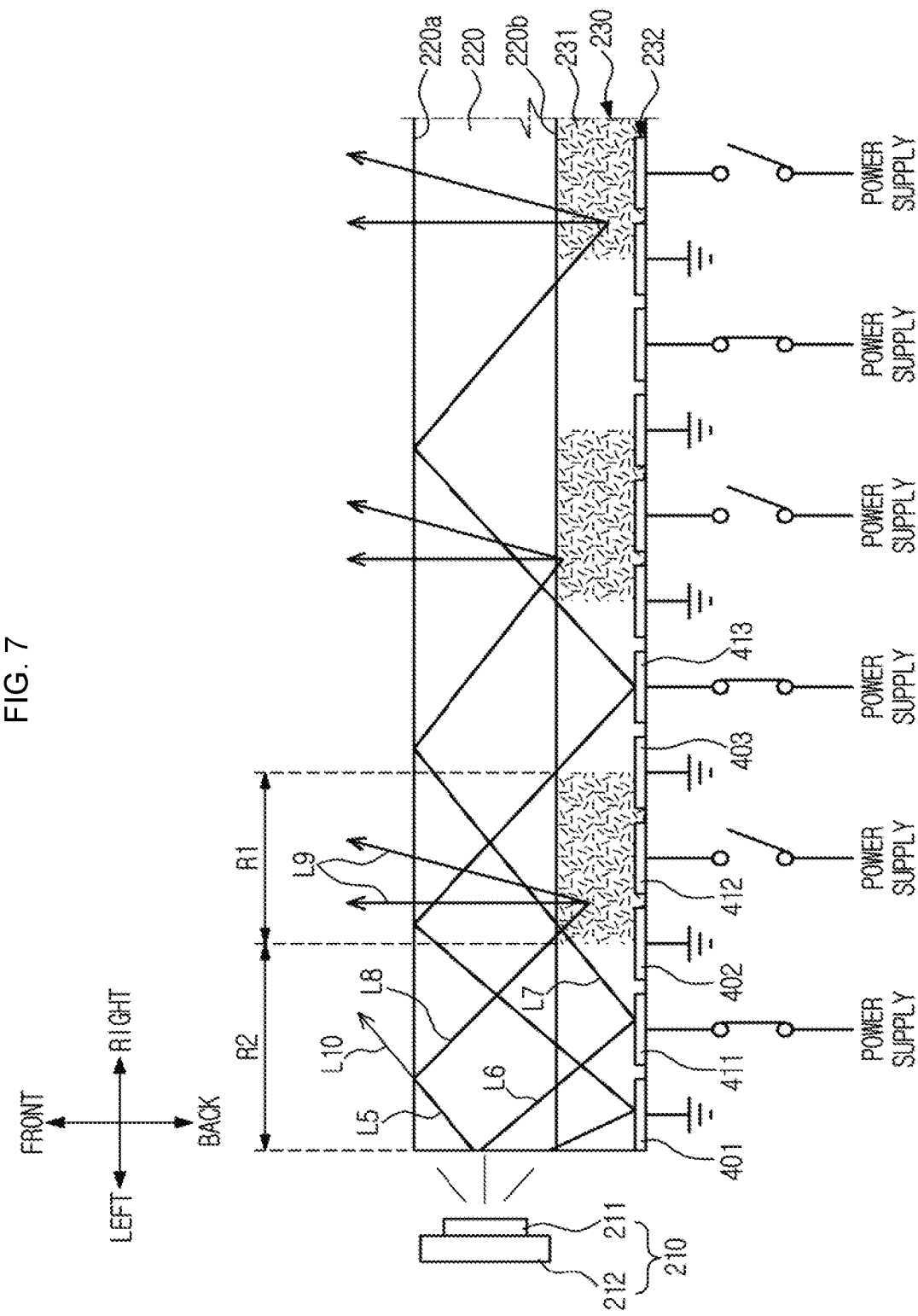
FIG. 7 is a view illustrating another example of an operation of a backlight unit according to an embodiment.

FIG. 6 is a view illustrating an example of an operation of a backlight unit according to an embodiment. FIG. 7 is a view illustrating another example of an operation of a backlight unit according to an embodiment.

As illustrated in FIGS. 6 and 7, the backlight unit 200 may include the light source 211, the light guide plate 220, and the local dimming unit 230.

The light source 211 may be provided at the edge portion of the light guide plate 220 to emit the monochromatic light or the white light, and the light guide plate 220 may spread the light emitted from the light source 211 provided at the edge portion to the central portion and emit light toward the front.

The local dimming unit 230 may include the electro-optical layer 231 that passes or scatters light according to an electric field, and the plurality of electrodes 232 that generate an electric field in the electro-optical layer 231.

The electro-optical layer 231 may be provided between the light guide plate 220 and the plurality of electrodes 232, and may include the electro-optical material 231a whose optical properties change according to an electric field. For example, when an electric field is generated, the electro-optical material 231a of the electro-optical layer 231 may pass light. When an electric field is not generated, the electro-optical material 231a may scatter light.

The plurality of electrodes 232 may include the common electrodes 232a and the signal electrodes 232b. Particularly, the plurality of electrodes 232 include the first common electrode 401, the first signal electrode 411, the second common electrode 402, the second signal electrode 412, a third common electrode 403, and a third signal electrode 413. The first, second, and third common electrodes 401, 402, and 403 may represent the reference potential, and the first, second, and third signal electrodes 411, 412, and 413 may each receive a voltage for generating an electric field.

As illustrated in FIG. 6, the voltage may be applied to the first signal electrode 411, the second signal electrode 412, and the third signal electrode 413. As a result, an electric field may be generated between the first, second, and third signal electrodes 411, 412, and 413 and the first, second, and third common electrodes 401, 402, and 403.

In other words, an electric field may be generated throughout the electro-optical layer 231. Since an electric field is generated throughout the electro-optical layer 231, light may pass through the electro-optical layer 231 throughout the electro-optical layer 231.

Particularly, when the power is supplied to the light source 211, the light source 211 may emit light toward the light guide plate 220. The light emitted from the light source 211 may be incident into the light guide plate 220. The light incident from the edge portion of the light guide plate 220 may be propagated along the light guide plate 220 to the central portion of the light guide plate 220 by the total internal reflection inside the light guide plate 220.

For example, light L1 proceeding toward the front surface 220a of the light guide plate 220 may be totally internally reflected at the front surface 220a of the light guide plate 220. Since the refractive index of the light guide plate 220 is greater than that of air, the light L1 from the light guide plate 220 toward the air may be totally internally reflected at a boundary between the light guide plate 220 and the air according to the incident angle.

Light L2 proceeding toward the rear surface 220b of the light guide plate 220 may pass through the rear surface 220b of the light guide plate 220 to be incident on the electro-optical layer 231. Since there is no significant difference between the refractive index of the light guide plate 220 and the refractive index of the electro-optical layer 231, the light L2 from the light guide plate 220 toward the electro-optical layer 231 may pass through a boundary between the light guide plate 220 and the electro-optical layer 231.

The light L2 incident from the light guide plate 220 to the electro-optical layer 231 may be propagated from the electro-optical layer 231 to the plurality of electrodes 232. Since an electric field is formed inside the electro-optical layer 231 by the plurality of electrodes 232, the electro-optical layer 231 may pass light, and the light L2 incident on the electro-optical layer 231 may pass through the electro-optical layer 231 to reach the plurality of electrodes 232. The light L2 reaching the plurality of electrodes 232 may be reflected by the plurality of electrodes 232.

Light L3 reflected from the plurality of electrodes 232 may propagate toward the light guide plate 220 through the electro-optical layer 231. Further, the light L3 reflected from the plurality of electrodes 232 may pass through the boundary between the electro-optical layer 231 and the light guide plate 220 and enter the light guide plate 220.

The light L3 incident into the light guide plate 220 may be propagated toward the central portion of the light guide plate 220. Further, the light L3 incident into the light guide plate 220 may be totally internally reflected on the front surface 220a of the light guide plate 220.

In this way, the light emitted from the light source 211 may be propagated from the edge portion of the backlight unit 200 to the central portion inside the light guide plate 220 and the local dimming unit 230 by total internal reflection and reflection.

In addition, some light L4 of the lights L1 and L3 proceeding toward the front surface 220a of the light guide plate 220 may be emitted to the outside through the front surface 220a of the light guide plate 220. A ratio of the light L4 emitted from the light guide plate 220 among the lights L1 and L3 proceeding toward the front surface 220a of the light guide plate 220 may be constant regardless of the location. In other words, uniform light may be emitted from the entire light guide plate 220.

On the other hand, as illustrated in FIG. 7, the voltage may be applied to the first signal electrode 411 and the third signal electrode 413 and the voltage may not be applied to the second signal electrode 412. As a result, an electric field may be generated between the first signal electrode 411 and the second common electrode 402 and between the third signal electrode 413 and the third common electrode 403, and an electric field may not be generated between the second signal electrode 412 and the second and third common electrodes 402 and 403.

In other words, an electric field may be partially generated in the electro-optical layer 231. Thereby, the electro-optical layer 231 may be partially transparent. Particularly, the electro-optical layer 231 may be transparent in the portion where the electric field is generated, and the electro-optical layer 231 may be opaque in the portion where the electric field is not generated. Also, light may pass through the transparent portion of the electro-optical layer 231, light does not pass through the opaque portion of the electro-optical layer 231, and light may be scattered in the opaque portion of the electro-optical layer 231.

Particularly, when the power is supplied to the light source 211, the light source 211 may emit light toward the light guide plate 220. The light emitted from the light source 211 may be incident into the light guide plate 220. The light incident from the edge portion of the light guide plate 220 may be propagated along the light guide plate 220 to the central portion of the light guide plate 220 by the total internal reflection inside the light guide plate 220.

For example, light L5 proceeding toward the front surface 220a of the light guide plate 220 may be totally internally reflected at the front surface 220a of the light guide plate 220.

Lights L6 and L8 proceeding toward the rear surface 220b of the light guide plate 220 may pass through the rear surface of the light guide plate 220 and enter the electro-optical layer 231. The lights L6 and L8 incident on the electro-optical layer 231 may be propagated or scattered to the plurality of electrodes 232 depending on whether the electro-optical layer 231 is transparent or opaque.

The light L6 incident on the transparent portion of the electro-optical layer 231 may pass through the electro-optical layer 231 to reach the plurality of electrodes 232. Further, the light L6 may be reflected from the plurality of electrodes 232, and light L7 reflected by the plurality of electrodes 232 may propagate toward the central portion of the light guide plate 220.

The light L8 incident on the opaque portion of the electro-optical layer 231 may be scattered from the electro-optical layer 231. Particularly, the light L8 may be refracted in various directions by the electro-optical material 231a in the opaque portion of the electro-optical layer 231. Because the incident light is refracted in various directions without consistency, the electro-optical layer 231 may appear opaque.

Some of light L9 refracted in various directions may be refracted in a direction similar to a normal direction of the front surface 220a of the light guide plate 220. In other words, the angle (hereinafter referred to as the "incident angle") between the light L9 scattered (refracted in various directions) in the electro-optical layer 231 and the normal direction of the front surface 220a of the light guide plate 220 may be smaller than a critical angle for generating the total internal reflection in the light guide plate 220. Therefore, the light L9 scattered from the electro-optical layer 231 may be emitted to the outside through the front surface 220a of the light guide plate 220.

In addition, some of light L10 of the light L5 proceeding toward the front surface 220a of the light guide plate 220 as described with reference to FIG. 6 may be emitted to the outside through the front surface 220a of the light guide plate 220.

The intensity of the light L9 emitted from the light guide plate 220 due to scattering in the electro-optical layer 231 may be greater than the intensity of the light L10 passing through the front surface 220a of the light guide plate 220 without the total internal reflection at the front surface 220a of the light guide plate 220.

Therefore, the intensity of the light L9 emitted from a first region R1 corresponding to the portion where the light is scattered in the electro-optical layer 231 may be greater than the intensity of the light L10 emitted from a second region R2 corresponding to the portion through which the light passes through the electro-optical layer 231. In other words, the intensity of the light L9 emitted from the first region R1 corresponding to the second signal electrode 412 to which the voltage is applied in the backlight unit 200 may be greater than the intensity of the light L10 emitted from the second region R2 corresponding to the first and third signal electrodes 411 and 413.

Accordingly, the intensity of light emitted from the light guide plate 220 may be non-uniform depending on the location, and the intensity of light according to the location may be controlled. Particularly, the intensity of light emitted from a specific region of the light guide plate 220 may be controlled according to whether the voltage is applied to the signal electrodes 232b. In other words, active local dimming may be implemented.

The electro-optical material has been described above that becomes transparent when an electric field is applied and becomes opaque when the electric field is removed, but is not limited thereto. For example, the electro-optical material may be opaque when an electric field is applied and transparent when the electric field is removed.

Figure 8:
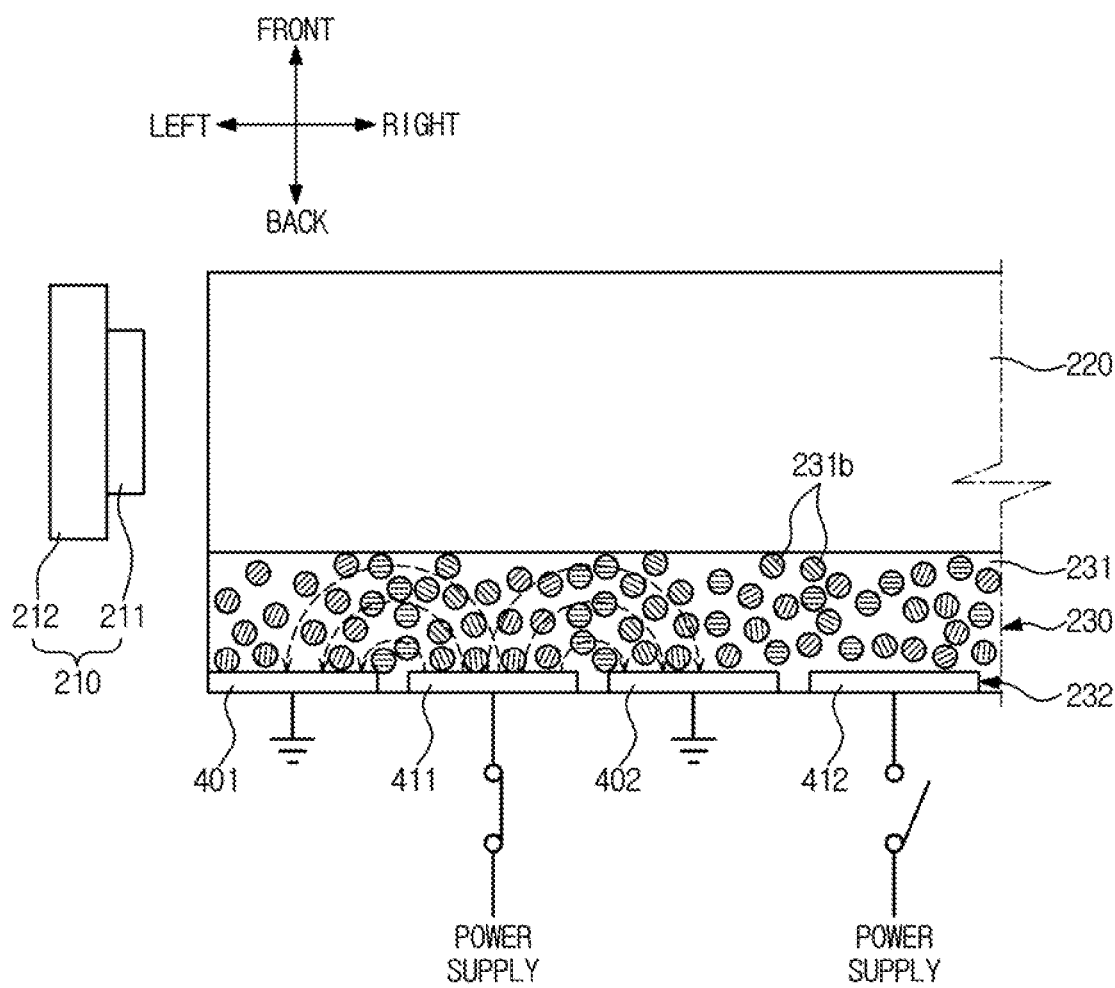
FIG. 8 is a view illustrating an implementation example of a backlight unit according to an embodiment.

FIG. 8 is a view illustrating an implementation example of a backlight unit according to an embodiment.

The backlight unit 200 may include the light source 211, the light guide plate 220, and the local dimming unit 230. The local dimming unit 230 may include the electro-optical layer 231 and the plurality of electrodes 232. The light source 211, the light guide plate 220, and the plurality of electrodes 232 may be the same as those illustrated in FIGS. 6 and 7.

As illustrated in FIG. 8, the electro-optical layer 231 may be provided between the light guide plate 220 and the plurality of electrodes 232, and may include a polymer dispersion liquid crystal (PDLC) 231b whose optical properties change according to an electric field.

The PDLC 231b may be formed by manufacturing immiscible mixtures (emulsions) of a liquid crystal and a polymer.

The mixtures may have both the structural advantages of the polymer and the electro-optical properties of the liquid crystal.

A liquid-state liquid crystal and a liquid-state polymer may be mixed to form the emulsions. In addition, optically curable adhesives that can be cured by ultraviolet light (optically curing adhesives), for example, poly-acrylates or poly-thiolenes may be used. As the curing of the polymer progresses, phase separation between the liquid crystal and the immiscible polymer may occur. Particularly, the polymer may be cured in the mixtures of the liquid crystal and the polymer such that droplets of liquid crystal are separated from the polymer structure. As a result, the PDLC 231b may be manufactured.

When a concentration of the polymer in the mixtures is 30% to 50%, liquid crystal droplets that are micro-scale may be manufactured. The liquid crystal molecules of the liquid crystal droplets may be locally aligned, but each liquid crystal droplet may be randomly aligned. Due to the size of the liquid crystal droplets and isotropic nature of the liquid crystal droplets, the PDLC 231b may scatter light and have a milky color.

When an electric field is applied to the PDLC 231b, electro-optical rearrangement of the liquid crystal droplets may occur, and a degree of scattering of the PDLC 231b may be reduced and become transparent.

As illustrated in FIG. 8, the voltage may be applied to the first signal electrode 411, and the voltage may not be applied to the second signal electrode 412. As a result, an electric field may be generated between the first signal electrode 411 and the second common electrode 402, and an electric field may not be generated between the second signal electrode 412 and the second common electrode 402. In other words, an electric field may be partially generated in the electro-optical layer 231.

The liquid crystal droplets of the PDLC 231b of the portion (between the first signal electrode and the second common electrode) where the electric field is generated may be aligned by the electric field, and the light scattering property of the PDLC 231b may be reduced. Therefore, the PDLC 231b may be made transparent in the portion where the electric field is generated. In addition, the light emitted from the light source 211 may pass through the transparent PDLC 231b.

The liquid crystal droplets of the PDLC 231b of the portion (between the second signal electrode and the second common electrode) where the electric field is not generated may be aligned in any direction, and the PDLC 231b may have the light scattering properties. Therefore, the PDLC 231b may be made opaque in the portion where the electric field is not generated. In addition, the light emitted from the light source 211 may be scattered by the opaque PDLC 231b and may be emitted through the front surface 220a of the light guide plate 220.

Figure 9:
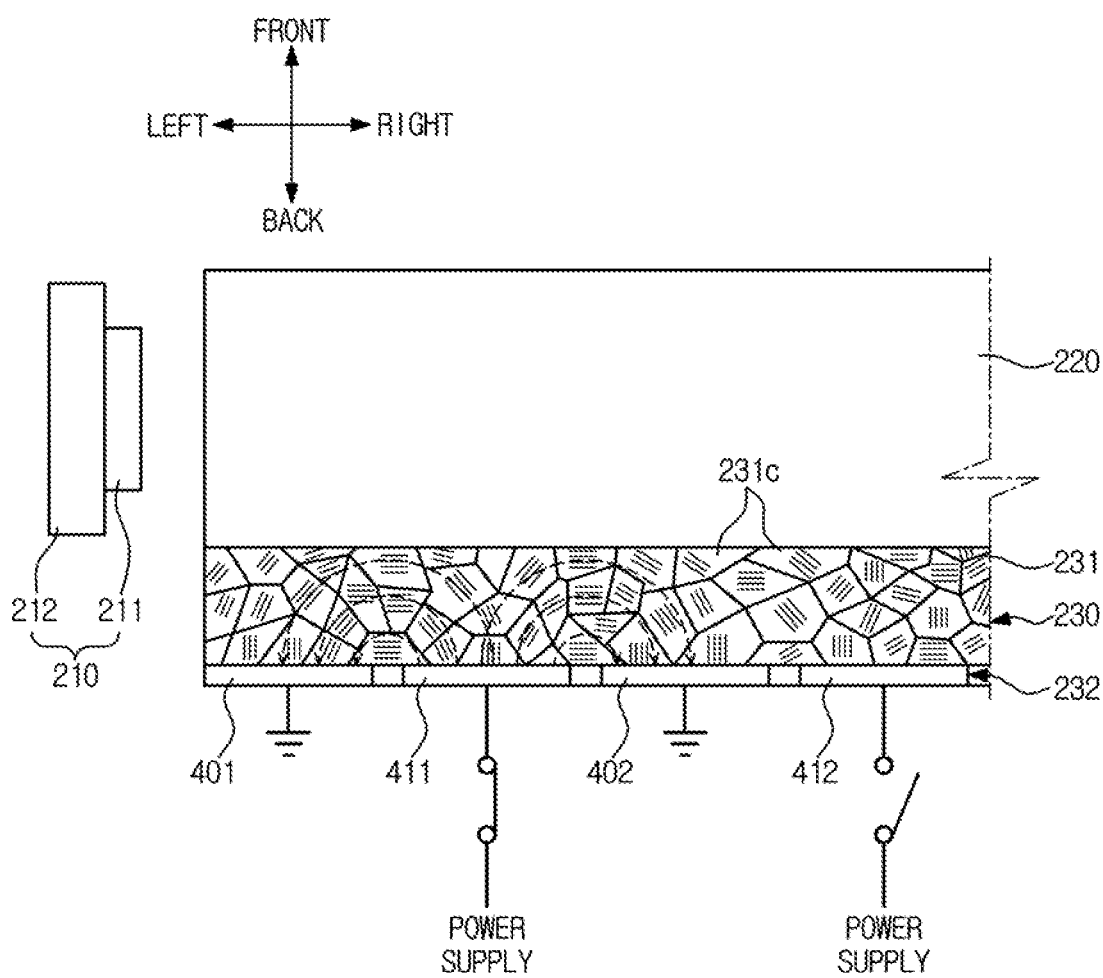
FIG. 9 is a view illustrating another implementation example of a backlight unit according to an embodiment.

FIG. 9 is a view illustrating another implementation example of a backlight unit according to an embodiment.

The backlight unit 200 may include the light source 211, the light guide plate 220, and the local dimming unit 230. The local dimming unit 230 may include the electro-optical layer 231 and the plurality of electrodes 232. The light source 211, the light guide plate 220, and the plurality of electrodes 232 may be the same as those illustrated in FIGS. 6 and 7.

As illustrated in FIG. 9, the electro-optical layer 231 may be provided between the light guide plate 220 and the plurality of electrodes 232, and may include a polymer network liquid crystal (PNLC) 231c whose optical properties change according to an electric field.

When the concentration of the polymer in the mixtures of the liquid crystal and the polymer is 1% to 10%, the mixtures may be mainly composed of the liquid crystal, and a diffusion network of the polymer chain may be formed throughout the mixtures. As a result, the PNLC 231c in the form of a viscous liquid or gel may be manufactured.

The electro-optical properties of the PNLC 231c may be the same as the PDLC 231b illustrated in FIG. 8.

As illustrated in FIG. 9, the voltage may be applied to the first signal electrode 411, and the voltage may not be applied to the second signal electrode 412. As a result, an electric field may be generated between the first signal electrode 411 and the second common electrode 402, and an electric field may not be generated between the second signal electrode 412 and the second common electrode 402. In other words, an electric field may be partially generated in the electro-optical layer 231.

The liquid crystal molecules of the PNLC 231c of the portion (between the first signal electrode and the second common electrode) where the electric field is generated may be aligned by the electric field, and the PNLC 231c may be transparent. In addition, the light emitted from the light source 211 may pass through the transparent PNLC 231c.

The liquid crystal droplets of the PNLC 231c in the portion (between the second signal electrode and the second common electrode) where the electric field is not generated may be aligned in any direction, and the PNLC 231c may be opaque. In addition, the light emitted from the light source 211 may be scattered by the opaque PNLC 231c and may be emitted through the front surface 220a of the light guide plate 220.

Figure 10:
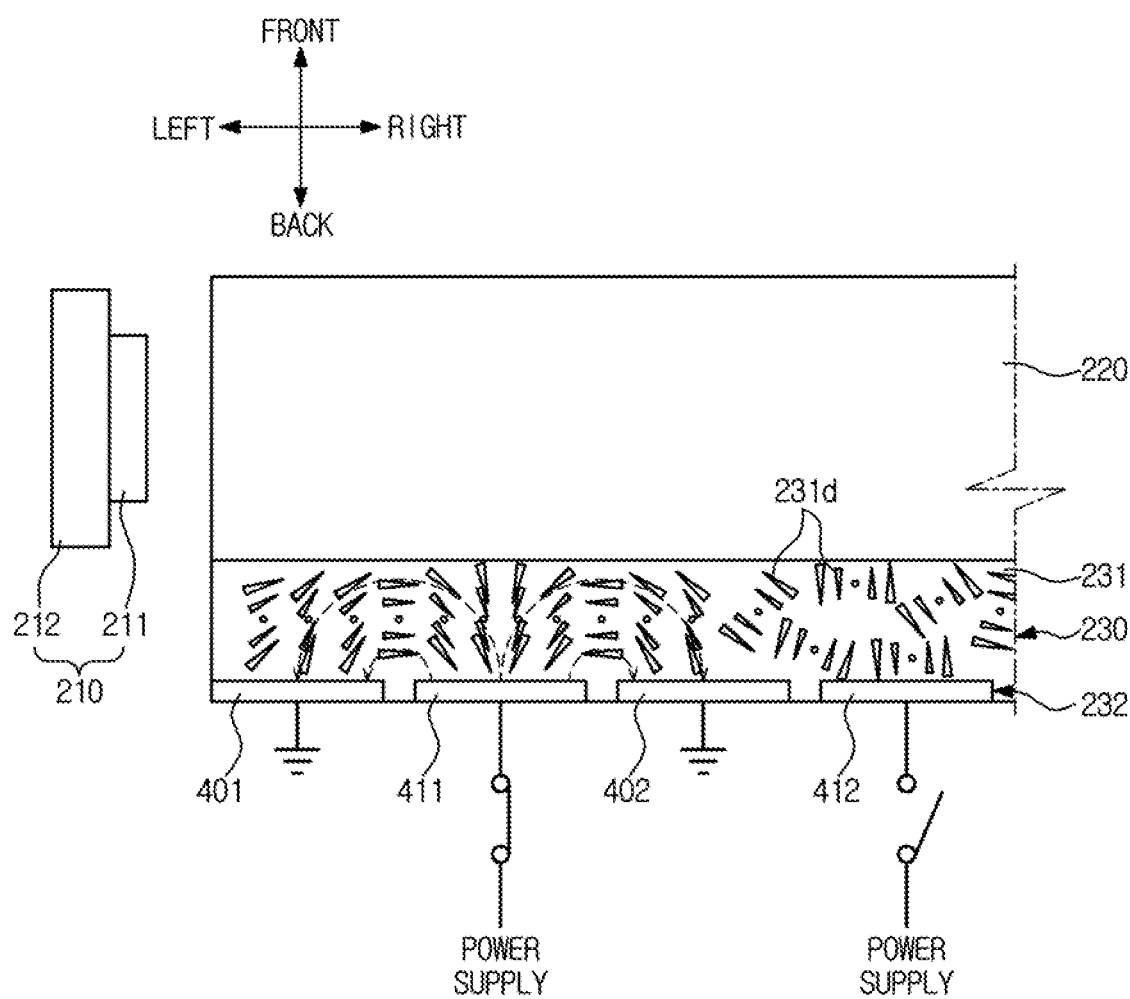
FIG. 10 is a view illustrating another implementation example of a backlight unit according to an embodiment.

FIG. 10 is a view illustrating another implementation example of a backlight unit according to an embodiment.

The backlight unit 200 may include the light source 211, the light guide plate 220, and the local dimming unit 230. The local dimming unit 230 may include the electro-optical layer 231 and the plurality of electrodes 232. The light source 211, the light guide plate 220, and the plurality of electrodes 232 may be the same as those illustrated in FIGS. 6 and 7.

As illustrated in FIG. 10, the electro-optical layer 231 may be provided between the light guide plate 220 and the plurality of electrodes 232, and may include a cholesteric liquid crystal 231d whose optical properties change according to an electric field.

The cholesteric liquid crystal 231d may have a layered structure and the liquid crystal molecules may be arranged in parallel with respect to each layer. In addition, an arrangement direction of a long axis of the liquid crystal molecules is slightly deviated between adjacent layers, and the entire liquid crystal may have a spiral structure. Due to the spiral structure, the cholesteric liquid crystal 231d may have optical properties such as linearity, selective light scattering, circular light, and dichroism.

When there is no electric field, the cholesteric liquid crystal 231d may have the spiral structure, but when an electric field is applied to the cholesteric liquid crystal 231d, the cholesteric liquid crystal 231d may be rearranged in the direction of the electric field. Particularly, a state of the cholesteric liquid crystal 231d may include a planar state in which the cholesteric liquid crystal 231d having the spiral structure is regularly arranged, a homeotropic state in which the cholesteric liquid crystal 231d is arranged in a row, and a focal conic state in which the cholesteric liquid crystal 231d having the spiral structure is irregularly arranged. The homeotropic state is an unstable state, and the cholesteric liquid crystal 231d in the homeotropic state may transition to the planar state or the focal conic state when an external electric field is removed.

When a high voltage is applied to both ends of the cholesteric liquid crystal 231d, the cholesteric liquid crystal 231d may transition to the homeotropic state, and in the homeotropic state, the cholesteric liquid crystal 231d may pass light.

When the high voltage applied to both ends of the cholesteric liquid crystal 231d in the homeotropic state is removed, the cholesteric liquid crystal may transition to the planar state, and in the planar state, the cholesteric liquid crystal 231d may reflect light of a specific wavelength and pass light of different wavelengths.

When a low voltage is applied to both ends of the cholesteric liquid crystal 231d in the homeotropic state, the cholesteric liquid crystal 231d may transition to the focal conic state, and in the focal conic state, the cholesteric liquid crystal may scatter light.

As illustrated in FIG. 10, the high voltage may be applied to the first signal electrode 411, and the low voltage may be applied to the second signal electrode 412.

The cholesteric liquid crystal 231d of the portion (between the first signal electrode and the second common electrode) where the high voltage is applied may transition to the homeotropic state, and may pass light.

The cholesteric liquid crystal 231d of the portion (between the second signal electrode and the second common electrode) where the low voltage is applied may transition to the focal conic state, and may scatter light. In addition, the light emitted from the light source 211 may be scattered by the opaque cholesteric liquid crystal 231d and may be emitted through the front surface 220a of the light guide plate 220.

Figure 11:
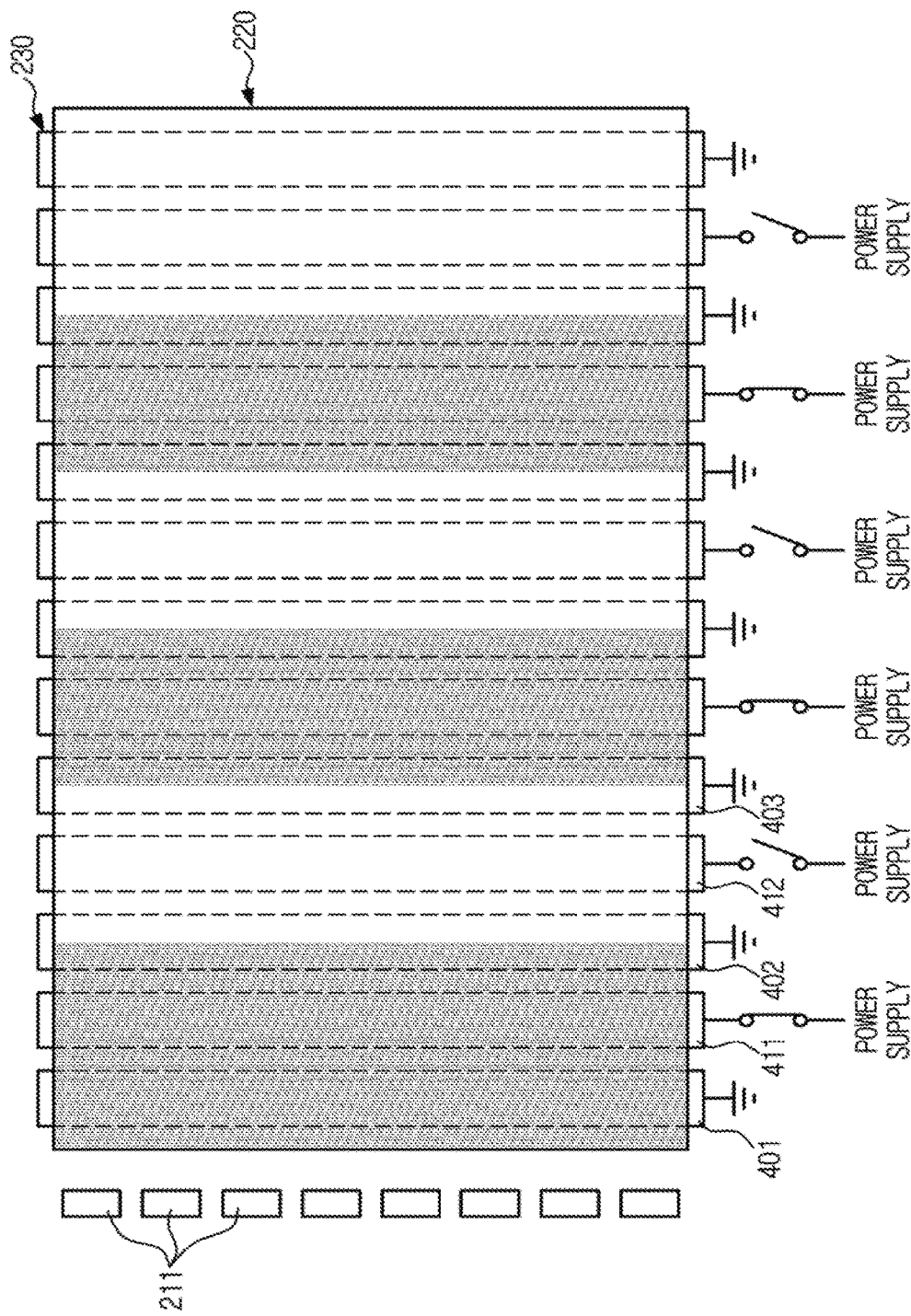
FIG. 11 is a view illustrating an example of a top view of a backlight unit according to an embodiment.

FIG. 11 is a view illustrating an example of a top view of a backlight unit according to an embodiment.

The backlight unit 200 may include the plurality of light sources 211, the light guide plate 220, and the local dimming unit 230. The local dimming unit 230 may include the electro-optical layer 231 and the plurality of electrodes 232. The plurality of light sources 211, the light guide plate 220 and the electro-optical layer 231 may be the same as those illustrated in FIGS. 6 and 7.

As illustrated in FIG. 11, the plurality of light sources 211 may be provided on a left edge portion of the light guide plate 220, and may emit light toward the right side of the light guide plate 220.

In addition, each of the plurality of electrodes 232 may have a bar shape extending from an upper side to a lower side of the backlight unit 200.

Particularly, the plurality of electrodes 232 may extend long in a direction perpendicular to a path through which the light emitted from the plurality of light sources 211 propagates. In addition, the plurality of electrodes 232 of the bar shape extending from the upper side to the lower side of the backlight unit 200 may be arranged side by side from left to right of the backlight unit 200. Therefore, the plurality of electrodes 232 may intersect the path through which the light emitted from the plurality of light sources 211 propagates.

The plurality of electrodes 232 may include the common electrodes 232a and the signal electrodes 232b. The common electrodes 232a and the signal electrodes 232b may be arranged side by side on the same plane, and may also be alternately disposed on the same plane.

For example, the plurality of electrodes 232 may include the first common electrode 401, the second common electrode 402, the third common electrode 403, the first signal electrode 411, and the second signal electrode 412. The plurality of electrodes 232 may be arranged in order of the first common electrode 401, the first signal electrode 411, the second common electrode 402, the second signal electrode 412, and the third common electrode 403.

The common electrodes 232a may be connected to ground or to each other.

The signal electrodes 232b may independently receive a voltage for generating an electric field. When the voltage is applied to the signal electrodes 232b, an electric field may be formed between the signal electrodes to which the voltage is applied and the peripheral common electrodes.

For example, as illustrated in FIG. 11, the voltage may be applied to the first signal electrode 411, and an electric field may be generated between the first signal electrode 411 and the first and second common electrodes 401 and 402. As a result, the electro-optical material 231a around the first signal electrode 411 may become transparent, and light may pass through the electro-optical material 231a around the first signal electrode 411.

In addition, the voltage may not be applied to the second signal electrode 412, and an electric field may not be generated between the second signal electrode 412 and the second and third common electrodes 402 and 403. Therefore, the electro-optical material 231a around the second signal electrode 412 may become opaque, and light may be scattered by the electro-optical material 231a around the second signal electrode 412. The scattered light may be output through the front surface 220a of the light guide plate 220.

As such, the electro-optical material around the signal electrode to which the voltage is applied may pass light and the electro-optical material around the signal electrode to which the voltage is not applied may scatter light. The light may be output from the light guide plate 220 around the signal electrode where no voltage is applied.

The backlight unit 200 may emit light having different luminance depending on the location. Particularly, the luminance of light emitted from the periphery of the signal electrode to which the voltage is not applied may be greater than the luminance of light emitted from the periphery of the signal electrode to which the voltage is applied. For example, when the voltage is alternately applied to the signal electrodes 232b, the backlight unit 200 may alternately emit low-luminance light and high-luminance light depending on the location, as illustrated in FIG. 11. The low luminance portion and the high luminance portion on the backlight unit 200 may be formed as a stripe pattern.

In particular, the luminance according to the location of the backlight unit 200 may be controlled according to the voltage input to the signal electrodes 232b, and the backlight unit 200 may actively perform local dimming.

Figure 12:
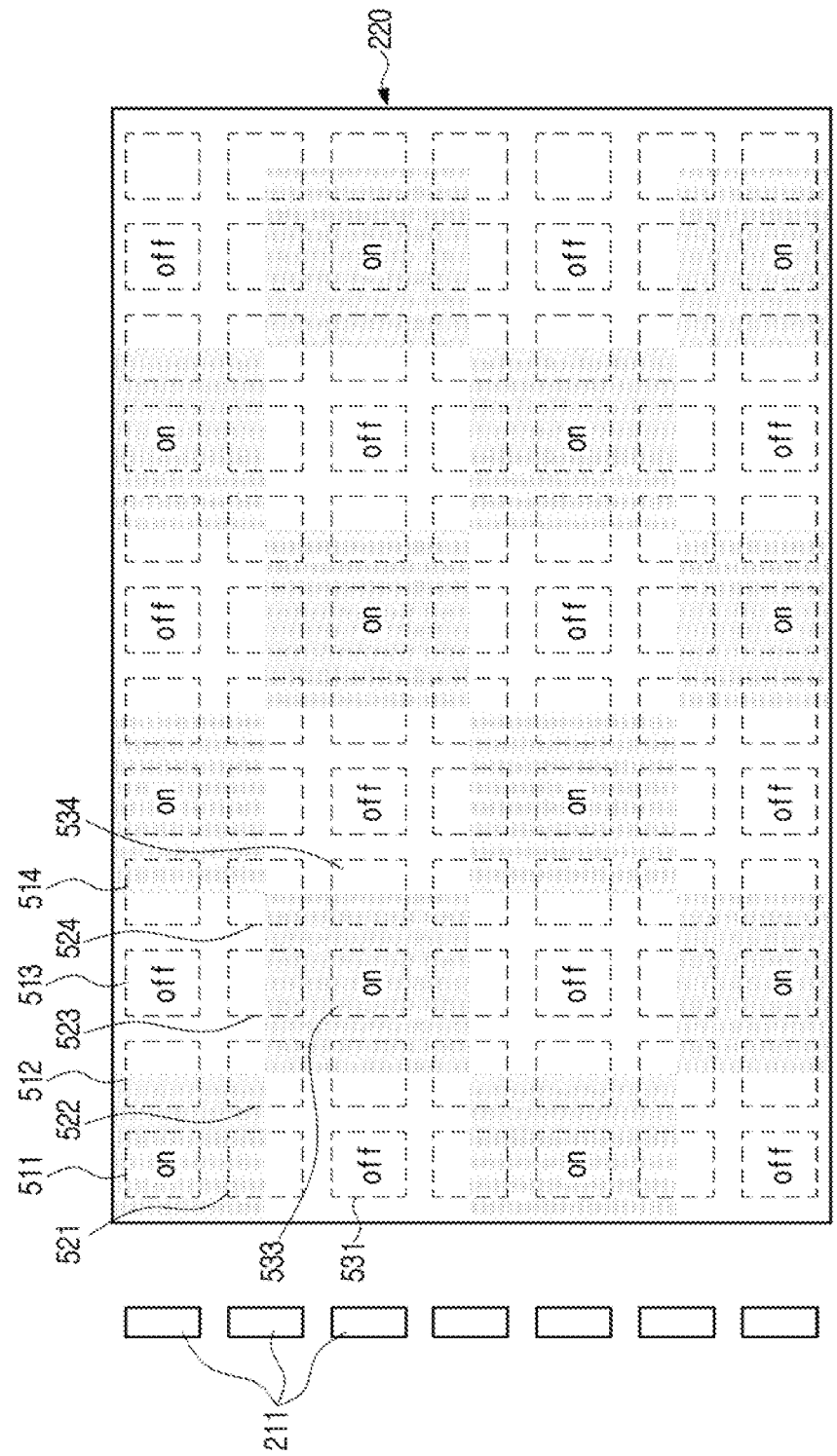
FIG. 12 is a view illustrating another example of a top view of a backlight unit according to an embodiment.

FIG. 12 is a view illustrating another example of a top view of a backlight unit according to an embodiment.

The backlight unit 200 may include the plurality of light sources 211, the light guide plate 220, and the local dimming unit 230. The local dimming unit 230 may include the electro-optical layer 231 and the plurality of electrodes 232. The plurality of light sources 211, the light guide plate 220 and the electro-optical layer 231 may be the same as those illustrated in FIGS. 6 and 7.

As illustrated in FIG. 12, the plurality of light sources 211 may be provided on the left edge portion of the light guide plate 220, and may emit light toward the central portion of the light guide plate 220.

In addition, each of the plurality of electrodes 232 may have a "patch" shape, and may be aligned by aligning columns and rows on the backlight unit 200.

Particularly, the plurality of electrodes 232 may be arranged in the row from left to right along the path through which the light emitted from the plurality of light sources 211 propagates. In addition, the plurality of electrodes 232 may be arranged in the row from the upper side to the lower side in the direction perpendicular to the path through which the light emitted from the plurality of light sources 211 propagates.

The plurality of electrodes 232 may include the common electrodes 232a and the signal electrodes 232b. The common electrodes 232a and the signal electrodes 232b may be arranged side by side on the same plane, and may also be alternately disposed on the same plane. Particularly, the signal electrodes 232b and the common electrodes 232a may be alternately arranged not only in a horizontal direction but also in a vertical direction. As a result, eight of the common electrodes 232a may be disposed around each of the signal electrodes 232b.

For example, the signal electrodes 232b may include a signal electrode 11 (511), a signal electrode 13 (513), a signal electrode 31 (531), and a signal electrode 33 (533). The common electrodes 232a may include a common electrode 12 (512), a common electrode 14 (514), a common electrode 21 (521), a common electrode 22 (522), a common electrode 23 (523), a common electrode 24 (524), a common electrode 32 (532), and a common electrode 34 (534).

The common electrode 12 (512), the common electrode 21 (521), and the common electrode 22 (522) may be disposed around the signal electrode 11 (511). In addition, the common electrode 12 (512), the common electrode 14 (514), the common electrode 22 (522), the common electrode 23 (523), and the common electrode 24 (524) may be disposed around the signal electrode 13 (513).

The common electrodes 232a may be connected to ground or to each other.

The signal electrodes 232b may independently receive the voltage for generating an electric field. When the voltage is applied to the signal electrodes 232b, an electric field may be formed between the signal electrodes to which the voltage is applied and the peripheral common electrodes.

For example, as illustrated in FIG. 12, the voltage may be applied to the signal electrode 11 (511) and an electric field may be generated between the signal electrode 11 (511) and the common electrodes 12/21/22 (512, 521, and 522). Accordingly, the electro-optical material 231a around the signal electrode 11 (511) may become transparent, and light may pass through the electro-optical material 231a around the signal electrode 11 (511).

In addition, the voltage may not be applied to the signal electrode 13 (513), and an electric field may not be generated between the signal electrode 13 (513) and the common electrodes 12/14/22/23/24 (512, 514, 522, 523, and 524). Therefore, the electro-optical material 231a around the signal electrode 13 (513) may become opaque, and light may be scattered by the electro-optical material 231a around the signal electrode 13 (513). The scattered light may be output through the front surface 220a of the light guide plate 220.

In this way, the backlight unit 200 may emit light having different luminance depending on the location. Particularly, the luminance of light emitted from the periphery of the signal electrode to which the voltage is not applied may be greater than the luminance of light emitted from the periphery of the signal electrode to which the voltage is applied. For example, when the voltage is alternately applied to the signal electrodes 232b, the backlight unit 200 may alternately emit low-luminance light and high-luminance light depending on the location, as illustrated in FIG. 12. The low luminance portion and the high luminance portion on the backlight unit 200 may be formed as a grid pattern.

Figure 13:
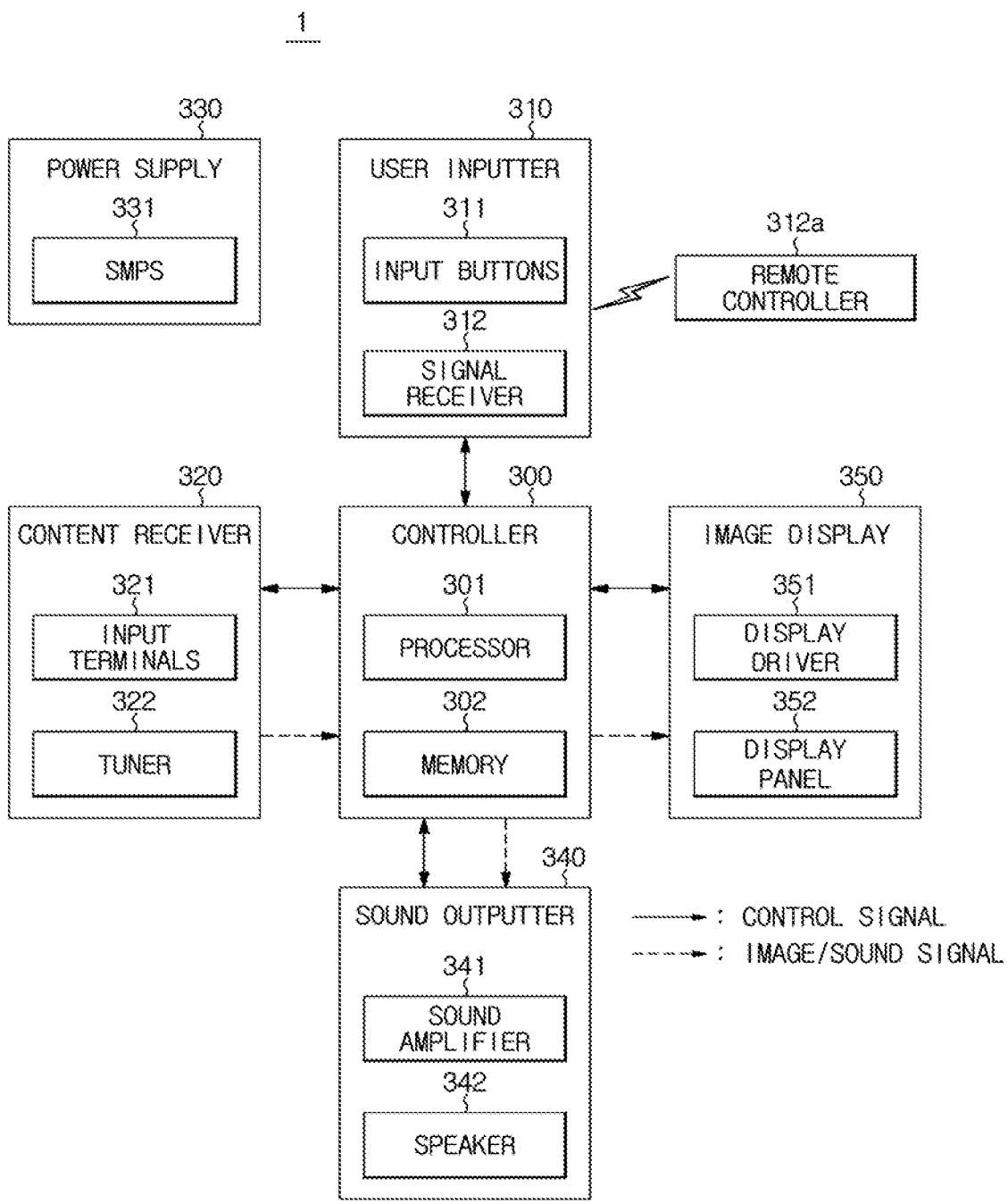
FIG. 13 is a view illustrating a control configuration of a display apparatus according to an embodiment.

FIG. 13 is a view illustrating a control configuration of a display apparatus according to an embodiment.

As illustrated in FIG. 13, the display apparatus 100 may include a user inputter 310 for receiving a user input from a user, a content receiver 320 for receiving a video signal and/or an audio signal from content sources, a controller 300 for processing the video signal and/or the audio signal received by the content receiver 320 and controlling an operation of the display apparatus 100, a power supply 330 for supplying power to components of the display apparatus 100, a sound outputter 340 for outputting sound processed by the controller 300, and an image display 350 for displaying an image processed by the controller 300.

The user inputter 310 may include input buttons 311 for receiving the user input. For example, the user inputter 310 may include a power button for turning on or off the display apparatus 100, a sound control button for adjusting the volume of the sound output by the display apparatus 100, a source selection button for selecting the content source, and the like.

The input buttons 311 may each receive the user input and output an electrical signal corresponding to the user input to the controller 300. The input buttons 311 may be implemented by various input devices, such as a push switch, a touch switch, a dial, a slide switch, a toggle switch, and the like.

The user inputter 310 may also include a signal receiver 312 for receiving a remote control signal of a remote controller 312a. The remote controller 312a for receiving the user input may be provided separately from the display apparatus 100, and may receive the user input and transmit a radio signal corresponding to the user input to the display apparatus 100. The signal receiver 312 may receive the radio signal corresponding to the user input from the remote controller 312a and output an electrical signal corresponding to the user input to the controller 300.

The content receiver 320 may include input terminals 321 and a tuner 322 that receive the video signal and/or the audio signal from the content sources.

The input terminals 321 may receive the video signal and the audio signal from the content sources through the cable. For example, the input terminals 321 may be a component (YPbPr/RGB) terminal, a composite (composite video blanking and sync (CVBS)) terminal, an audio terminal, a high definition multimedia interface (HDMI) terminal, a universal serial bus (USB) terminal, and the like.

The tuner 322 may receive broadcast signals through the broadcast receiving antenna or a wired cable and extract a broadcast signal of a channel selected by the user from the broadcast signals. For example, the tuner 322 may pass a broadcast signal having a frequency corresponding to a channel selected by the user among a plurality of the broadcast signals received through the broadcast receiving antenna or the wired cable, and block the broadcast signals having other frequencies.

As such, the content receiver 320 may receive a video signal and an audio signal from the content sources through the input terminals 321 and/or the tuner 322, and may output the video signal and the audio signal received through the input terminals 321 and/or the tuner 322 to the controller 300.

The controller 300 may include a processor 301 for processing data and a memory 302 for storing data.

The memory 302 may store programs and data for controlling the display apparatus 100 and temporarily store the data generated while the display apparatus 100 is being controlled.

In addition, the memory 302 may store the programs and data for processing video signals and/or audio signals, and temporarily store the data generated during the processing of the video signals and/or audio signals.

The memory 302 may include a non-volatile memory such as ROM or flash memory for storing the data for a long period of time, a volatile memory such as static random access memory (S-RAM) or dynamic random access memory (D-RAM) for temporarily storing the data.

The processor 301 may receive the user input from the user inputter 310 and generate control signals for controlling the content receiver 320 and/or the image display 350 and/or the sound outputter 340 according to the user input.

In addition, the processor 301 may receive the video signal and/or the audio signal from the content receiver 320, decode the video signal to generate image data, and decode the audio signal to generate sound data. The image data and the sound data may be output to the image display 350 and the sound outputter 340, respectively.

The processor 301 may include an operation circuit to perform logic operations and arithmetic operations and a memory circuit to temporarily store computed data.

The controller 300 may control operations of the content receiver 320, the image display 350, and the sound outputter 340 according to the user input. For example, when the content source is selected by the user input, the controller 300 may control the content receiver 320 to receive the video signal and/or the audio signal from the selected content source.

In addition, the controller 300 may process the video signal and/or the audio signal received by the content receiver 320, and reproduce the image and the sound from the video signal and/or the audio signal. In detail, the controller 300 may decode the video signal and/or the audio signal, and may restore the image data and the sound data from the video signal and/or the audio signal.

The controller 300 may be implemented as the control circuit in the control assembly 140 illustrated in FIG. 2.

The controller 300 may convert the sound data decoded from the audio signal into an analog sound signal, and a sound amplifier 341 may amplify the analog sound signal output from the controller 300.

The power supply 330 may supply power to the user inputter 310, the content receiver 320, the controller 300, the image display 350, the sound outputter 340, and all the other components.

The power supply 330 may include a switching mode power supply 331 (hereinafter, referred to as 'SMPS').

The SMPS 331 may include an AC-DC converter for converting alternating current (AC) power of an external power source to direct current (DC) power, and a DC-DC converter for changing a voltage of DC power. For example, the AC power of an external power source may be converted into DC power by the AC-DC converter, and the voltage of the DC power may be changed into various voltages (for example, 5V and/or 15V) by the DC-DC converter. The DC power whose voltage is changed may be supplied to the user inputter 310, the content receiver 320, the controller 300, the image display 350, the sound outputter 340, and all the other components, respectively.

The power supply 330 may be implemented as a power circuit in the power assembly 150 illustrated in FIG. 2.

The sound outputter 340 may include the sound amplifier 341 for amplifying sound, and a speaker 342 for audibly outputting the amplified sound.

The speaker 342 may convert the analog sound signal amplified by the sound amplifier 341 into an audible sound. For example, the speaker 342 may include a thin film that vibrates according to an electrical sound signal, and sound waves may be generated by the vibration of the thin film.

The image display 350 may include a display panel 352 for visually displaying an image and a display driver 351 for driving the display panel 352.

The display panel 352 may generate an image according to the image data received from the display driver 351, and display the image.

The display panel 352 may include a pixel serving as a unit for displaying the image. Each of the pixels may receive an electrical signal representative of the image from the display driver 351 and output an optical signal corresponding to the received electrical signal. As described above, the optical signals output by the plurality of pixels may be combined and displayed on the display panel 352.

The display panel 352 may include the liquid crystal panel 110 and the backlight unit 200.

The display driver 351 may receive the image data from the controller 300 and may drive the display panel 352 to display the image corresponding to the received image data. For example, the display driver 351 may output the image signal for displaying the image on the liquid crystal panel 110.

When the display driver 351 transmits the image signal corresponding to the image data to each of the plurality of pixels included in the liquid crystal panel 110, each of the plurality of pixels may output the light corresponding to the received image signal, and the light output from each of the plurality of pixels may be combined to form a single image.

The display driver 351 may be implemented as the driver IC 120 illustrated in FIG. 2.

Figure 14:
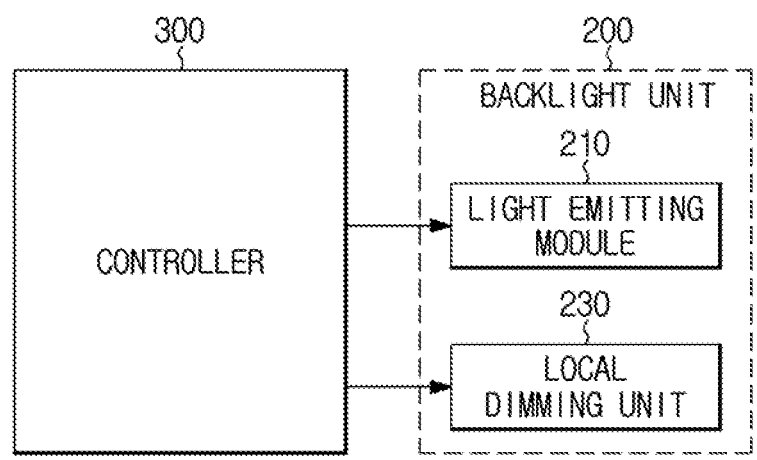
FIG. 14 is a view illustrating a controller and an image display included in a display apparatus according to an embodiment.

FIG. 14 is a view illustrating a controller and an image display included in a display apparatus according to an embodiment.

Referring to FIG. 14, the display apparatus 100 may include the controller 300 and the backlight unit 200, and the controller 300 may output a dimming signal for local dimming to the backlight unit 200.

As illustrated in FIG. 14, the controller 300 may control the backlight unit 200 to emit light of different brightness according to the location of the backlight unit 200. Particularly, the controller 300 may control the light emitting module 210 and the local dimming unit 230 so that the backlight unit 200 emits light of different brightness according to the location.

The controller 300 may control the light emitting module 210 such that the plurality of light sources 211 located at different locations emit light of different intensities according to the image data. In addition, the controller 300 may control the local dimming unit 230 such that the electro-optical materials 231a located at different locations have different scattering ratios according to the image data. As such, by controlling the intensity of light emitted from the plurality of light sources 211 and controlling the scattering ratio of the electro-optical material 231a, the controller 300 may control the intensity of light emitted from the backlight unit 200 according to the location.

The controller 300 may generate a dimming signal for local dimming based on the image data. For example, the controller 300 may divide an image by the image data into a plurality of regions. The controller 300 may determine a luminance value of a pixel having a maximum luminance in each of the plurality of regions and determine the luminance value of the plurality of regions based on the maximum luminance value in the plurality of regions. In addition, the controller 300 may generate a dimming signal based on the luminance values of the plurality of regions, and transmit the generated dimming signal to the light emitting module 210 and the local dimming unit 230.

The backlight unit 200 may perform the local dimming using the light emitting module 210 and the local dimming unit 230.

Figure 15:
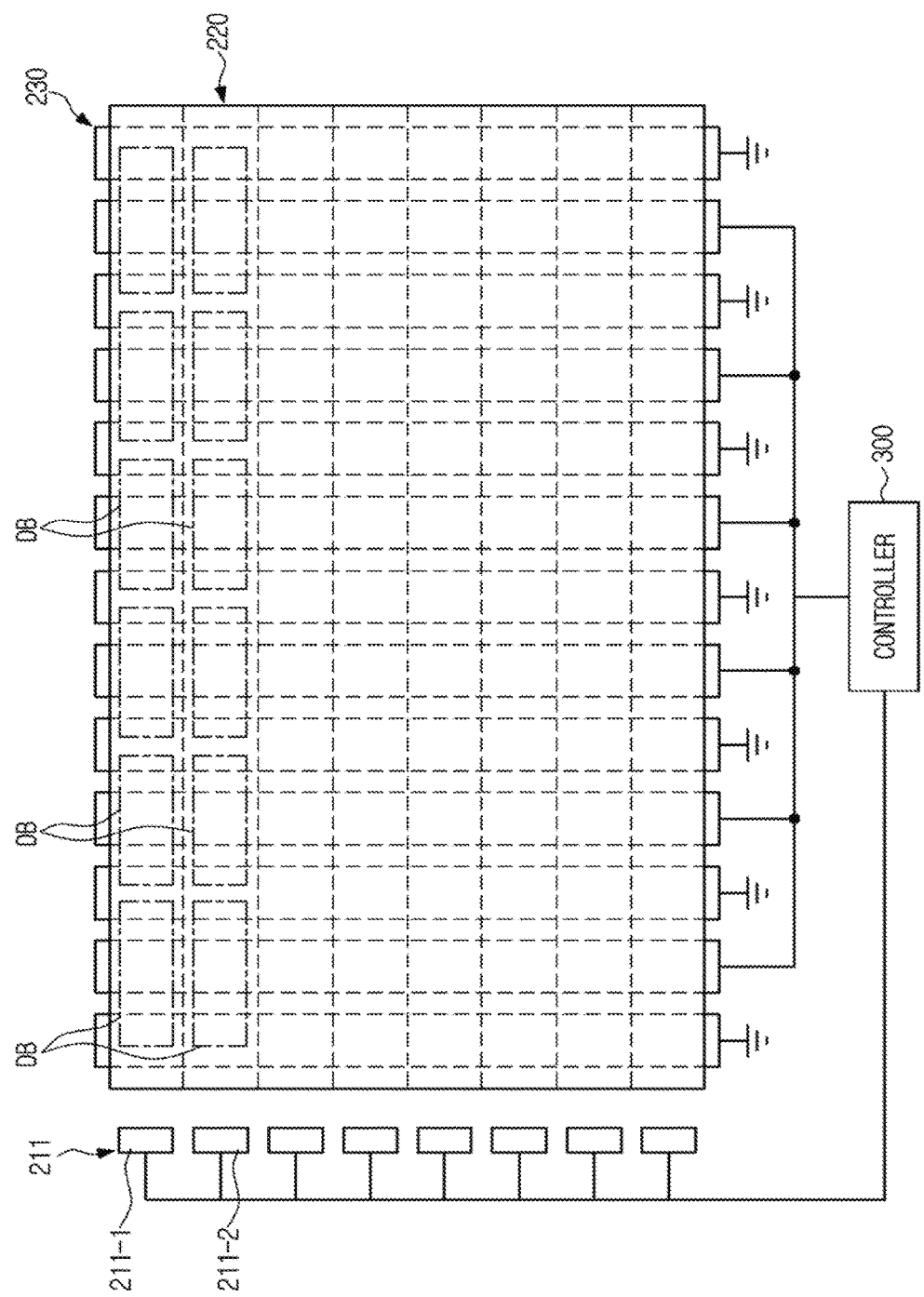
FIG. 15 is a view illustrating an example of a backlight unit included in a display apparatus according to an embodiment.

FIG. 15 is a view illustrating an example of a backlight unit included in a display apparatus according to an embodiment.

As illustrated in FIG. 15, the backlight unit 200 may include the plurality of light sources 211 and the plurality of electrodes 232.

The plurality of light sources 211 may be arranged in the row on the left side of the light guide plate 220 to emit light from left to right. The plurality of light sources 211 may be connected to the controller 300 and receive the dimming signal from the controller 300.

The plurality of electrodes 232 may have the bar shape extending from the upper side to the lower side of the light guide plate 220.

The plurality of electrodes 232 may include the common electrodes 232a and the signal electrodes 232b, and the common electrodes 232a may be connected to ground or connected to each other. The signal electrodes 232b may be connected to the controller 300 and may receive the dimming signal from the controller 300.

The controller 300 may analyze the image data and generate a dimming signal so that the backlight unit 200 outputs light of different brightness at different locations according to the image data. Here, the dimming signal may include dimming data representing a plurality of brightness. For example, when the dimming data is 4-bit data, the backlight unit 200 may emit light having 16 different luminance depending on the location by the dimming signal.

The controller 300 may divide the image based on the image data into the plurality of regions. The region dividing the image may correspond to dimming blocks DB for local dimming. Here, the dimming blocks DB may represent the region capable of outputting light of the same luminance on the backlight unit 200. Particularly, the same dimming blocks DB on the backlight unit 200 may emit light having the same luminance, and the other dimming blocks DB on the backlight unit 200 may emit light having different luminance. The size of the dimming blocks DB may depend on a width of the plurality of electrodes 232 included in the local dimming unit 230 and a width of the light emitted from the plurality of light sources 211 included in the light emitting module 210. Further, the number of the dimming blocks DB may depend on the number of the plurality of electrodes 232 and the number of the plurality of light sources 211.

The controller 300 may divide the image based on the image data into a plurality of the dimming blocks DB.

The controller 300 determines a maximum value among luminance values of pixels of the image belonging to the same dimming block. The size of each of the plurality of dimming blocks DB of the backlight unit 200 for local dimming may be larger than the size of a pixel of the liquid crystal panel 110. The liquid crystal panel 110 of Ultra High Definition (UHD) resolution may include 3840*2160 pixels, whereas the backlight unit 200 may include, for example, 320*180 dimming blocks. Therefore, the plurality of pixels may correspond to one of the dimming blocks DB.

The controller 300 may determine the maximum value among the luminance values of image pixels belonging to the same dimming block as the luminance value of the corresponding dimming block. The controller 300 may determine the luminance values of the plurality of dimming blocks DB in the same way.

The controller 300 may generate the dimming data for the plurality of light sources 211 of the light emitting module 210. The dimming data transmitted to the light source may indicate the intensity of the light output from the light source, and the intensity of the light output from the light source may be determined based on the maximum value among the luminance values of the dimming blocks DB located in the same row. Accordingly, the controller 300 may determine the maximum value among the luminance values of the dimming blocks DB located in the same row among the plurality of dimming blocks DB, and may generate the dimming data that is transmitted to the light source based on the maximum value among the luminance values of the dimming blocks DB located in the same row.

For example, the controller 300 may generate the dimming data that is transmitted to a first light source 211-1 based on the maximum value among the luminance values of the dimming blocks DB located in a first row. In addition, the controller 300 may generate the dimming data to be transmitted to a second light source 211-2 based on the maximum value among the luminance values of the dimming blocks DB located in a second row. In the same way, the controller 300 may generate the plurality of dimming data that are respectively transmitted to the plurality of light sources 211 based on the luminance values of the dimming blocks DB.

The controller 300 may generate first dimming data for the plurality of electrodes 232 of the local dimming unit 230. The dimming data transmitted to the signal electrode may indicate the degree of opacity (or scattering rate) of the electro-optical layer 231 around the signal electrode, and the scattering rate of the electro-optical layer 231 may be determined based on the maximum value among the luminance values of the dimming blocks DB located in the same column.

Therefore, the controller 300 may determine the maximum value among the luminance values of the dimming blocks DB located in the same column among the plurality of dimming blocks DB, and may generate the first dimming data that is transmitted to the signal electrode based on the maximum value among the luminance values of the dimming blocks DB located in the same column.

For example, the controller 300 may generate second dimming data transmitted to the first signal electrode 411 based on the maximum value among the luminance values of the dimming blocks DB located in the first column. In addition, the controller 300 may generate the dimming data transmitted to the second signal electrode 412 based on the maximum value among the luminance values of the dimming blocks DB located in the second row. In the same way, the controller 300 may generate the second dimming data that are respectively transmitted to the signal electrodes 232b.

As such, the controller 300 may transmit the dimming data to both the plurality of light sources 211 and the plurality of electrodes 232. Particularly, the controller 300 may control the intensity of light emitted from the plurality of light sources 211 and the local scattering rate of the electro-optical material 231a to control the luminance of light emitted from the dimming blocks DB. The controller 300 may generate the first dimming data according to the image data and transmit the first dimming data to the plurality of light sources 211. Also, the controller 300 may generate the second dimming data according to the image data and transmit the second dimming data to the plurality of electrodes 232.

For example, when the dimming data is 4-bit data, the first dimming data may be 2-bit data and the second dimming data may be 2-bit data. The plurality of light sources 211 may emit light of 4 gradations (4 steps) according to the 2-bit first dimming data. In addition, the electro-optical material 231a around the plurality of electrodes 232 may indicate the scattering rate of 4 gradations (4 steps) by the 2-bit first dimming data.

The backlight unit 200 may emit 16 gradations of light depending on the location by the 4 gradations of light emitted from the plurality of light sources 211 and the 4 gradations of the electro-optical material 231a. In other words, the backlight unit 200 may emit light having 16 different luminance depending on the location.

Figure 16:
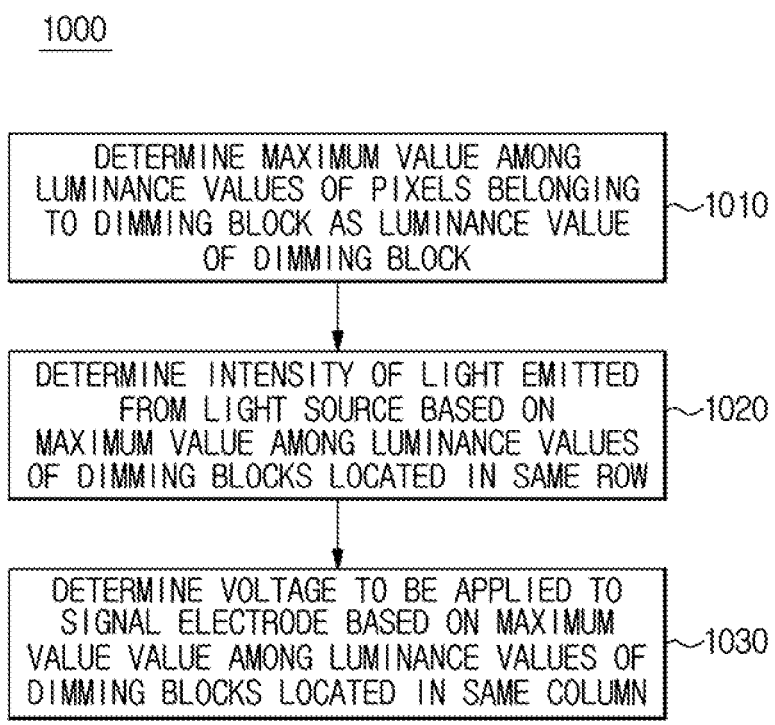
FIG. 16 is a view illustrating a local dimming operation of the backlight unit illustrated in FIG. 15.

FIG. 16 is a view illustrating a local dimming operation of the backlight unit illustrated in FIG. 15.

Referring to FIG. 16, the display apparatus 100 may determine luminance values of the plurality of dimming blocks DB (1010).

The controller 300 may determine the maximum value among luminance values of pixels belonging to the same dimming block. The controller 300 may determine the determined maximum value as the luminance value of the corresponding dimming block.

The display apparatus 100 may determine the intensity of light emitted by the plurality of light sources 211 (1020).

The controller 300 may determine the maximum value among the luminance values of the dimming blocks located in the same row. The controller 300 may determine the intensity of light (output intensity of the light source) emitted from the light source based on the determined maximum value.

In addition, the controller 300 may generate the first dimming data based on the output intensity of the light source, and may transmit the first dimming data to the plurality of light sources 211.

The display apparatus 100 may determine the applied voltage of the plurality of signal electrodes 232b (1030).

The controller 300 may determine the maximum value among the luminance values of the dimming blocks located in the same column. The controller 300 may determine the scattering rate of the electro-optical layer 231 based on the determined maximum value. The controller 300 may determine the intensity (applied voltage) of the voltage to be applied to the signal electrode based on the scattering rate of the electro-optical layer 231.

In addition, the controller 300 may generate the second dimming data based on the applied voltage and transmit the second dimming data to the plurality of signal electrodes 232b.

As described above, the display apparatus 100 may control the intensity of light emitted from the plurality of light sources 211 and the local scattering rate of the electro-optical layer 231 to perform the local dimming.

Figure 17:
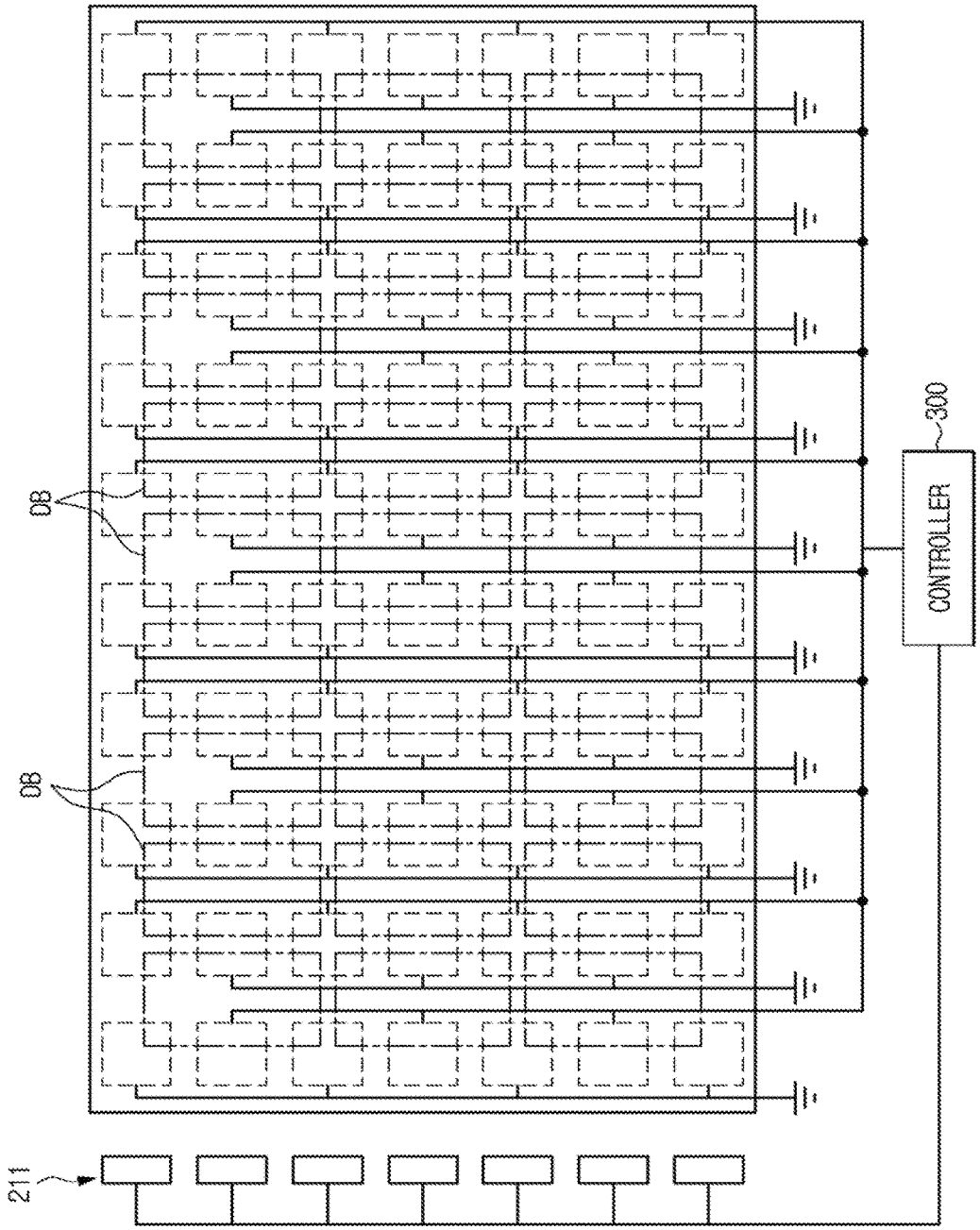
FIG. 17 is a view illustrating another example of a controller and a backlight unit included in a display apparatus according to an embodiment.

FIG. 17 is a view illustrating another example of a controller and a backlight unit included in a display apparatus according to an embodiment.

Referring to FIG. 17, the backlight unit 200 may include the plurality of light sources 211 and the plurality of electrodes 232.

The plurality of light sources 211 may be arranged in the row on the left side of the light guide plate 220 to emit light from left to right. The plurality of light sources 211 may be connected to the controller 300 and turned on/off by the controller 300.

Each of the plurality of electrodes 232 may have a patch shape, and may be aligned by aligning columns and rows on the backlight unit 200.

The plurality of electrodes 232 may include the common electrodes 232a and the signal electrodes 232b, and the common electrodes 232a may be connected to ground or connected to each other. The signal electrodes 232b may be connected to the controller 300 and may receive the dimming signal from the controller 300.

The controller 300 may analyze the image data, and may generate a dimming signal so that the backlight unit 200 outputs light of different brightness at different locations according to the image data. Particularly, the controller 300 may divide the image based on the image data into the plurality of dimming blocks DB.

The controller 300 may determine the maximum value among luminance values of pixels of the image belonging to the same dimming blocks DB. The controller 300 may set the maximum value among the luminance values of image pixels belonging to the same dimming block as the luminance value of the corresponding dimming block. The controller 300 may determine the luminance values of the plurality of dimming blocks DB in the same way.

The controller 300 may generate the first dimming data for the plurality of electrodes 232 based on the luminance values of the plurality of dimming blocks DB. Particularly, the controller 300 may generate the first dimming data transmitted to each of the signal electrodes 232b based on the luminance values of the plurality of dimming blocks DB.

For example, the controller 300 may generate the dimming data transmitted to the first signal electrode 411 based on the luminance value of the dimming block located in the first column of the first row. Also, the controller 300 may generate the dimming data transmitted to the second signal electrode 412 based on the luminance value of the dimming block located in the first row and third column. In the same way, the controller 300 may generate the dimming data that is transmitted to the signal electrodes 232b, respectively.

As such, when the backlight unit 200 includes the plurality of electrodes 232 aligned with rows and columns, the controller 300 may control the local scattering rate of the electro-optical material 231a to control the luminance of light emitted from the dimming blocks DB. Particularly, the controller 300 may transmit the dimming data to the plurality of electrodes 232.

For example, when the dimming data is 4-bit data, the electro-optical material 231a may represent the scattering rate of 16 gray levels (16 steps). In addition, the backlight unit 200 may emit 16 gradations of light depending on the location.

Figure 18:
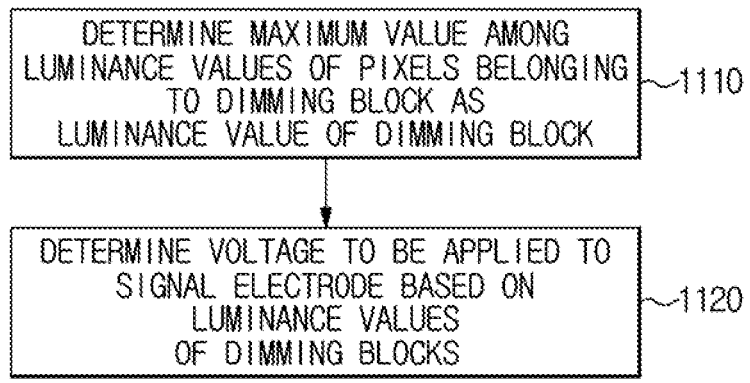
FIG. 18 is a view illustrating a local dimming operation of the backlight unit illustrated in FIG. 17.

FIG. 18 is a view illustrating a local dimming operation of the backlight unit illustrated in FIG. 17.

Referring to FIG. 18, the display apparatus 100 may determine the luminance value of the plurality of dimming blocks DB (1110).

The controller 300 may determine the maximum value among luminance values of pixels belonging to the same dimming block. The controller 300 may determine the determined maximum value as the luminance value of the corresponding dimming block.

The display apparatus 100 may determine the voltage to be applied to the plurality of signal electrodes 232*b* (1120).

The controller 300 may determine the scattering rate of the electro-optical layer 231 based on the luminance values of the plurality of dimming blocks DB. The controller 300 may determine the intensity (applied voltage) of the voltage to be applied to the signal electrode based on the scattering rate of the electro-optical layer 231. In addition, the controller 300 may generate the dimming data based on the applied voltage and transmit the dimming data to the plurality of signal electrodes 232*b*.

As described above, the display apparatus 100 may control the local scattering rate of the electro-optical layer 231 to perform the local dimming.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

Embodiments and examples of the disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

The invention claimed is:

1. A display apparatus comprising:
    a plurality of light sources configured to emit light;
    a light guide plate having a first surface and a second surface, configured to spread light emitted from the plurality of light sources therein and to emit light through the first surface; and
    a local dimming unit configured to reflect or scatter light emitted through the second surface of the light guide plate according to a location,
    wherein the local dimming unit comprises:
    an electro-optical layer configured to change optical properties according to an electric field;
    a plurality of electrodes located on the same plane, configured to generate the electric field; and
    a controller configured to change a voltage applied to the plurality of electrodes according to an image,
    wherein, when the controller applies a voltage to at least one of a plurality of signal electrodes, the electro-optical layer around the at least one of the plurality of signal electrodes is configured to pass light, and
    wherein the light passing through the electro-optical layer is configured to be spread inside the light guide plate.

2. The display apparatus according to claim 1, wherein, when the controller does not apply a voltage to at least one of the plurality of signal electrodes, the electro-optical layer around the at least one of the plurality of signal electrodes is configured to scatter light.

3. The display apparatus according to claim 1, wherein the light scattered by the electro-optical layer is emitted through the first surface of the light guide plate.

4. The display apparatus according to claim 1, wherein the plurality of electrodes comprises:
    a plurality of common electrodes,
        wherein the plurality of signal electrodes are configured to receive a voltage signal for generating the electric field.

5. The display apparatus according to claim 1, wherein the controller is configured to divide the image into a plurality of dimming blocks, to determine a maximum value among luminance values of pixels included in each of the plurality of dimming blocks as luminance value of each of the plurality of dimming blocks, and to control the voltage applied to the plurality of electrodes based on the luminance value of each of the plurality of dimming blocks.

6. The display apparatus according to claim 5, wherein the plurality of electrodes comprises a plurality of common electrodes in a form of a bar,
    wherein the plurality of signal electrodes are in a form of a bar, and
    wherein the plurality of common electrodes and the plurality of signal electrodes are alternately arranged side by side.

7. The display apparatus according to claim 6, wherein the controller is configured to control a current supplied to the plurality of light sources based on the maximum value among the luminance values of the dimming blocks located on a path of light emitted from the plurality of light sources.

8. The display apparatus according to claim 6, wherein the controller is configured to control the voltage applied to the plurality of signal electrodes based on the maximum value among the luminance values of the dimming blocks overlapping each of the plurality of signal electrodes.

9. The display apparatus according to claim 5, wherein the plurality of electrodes comprises a plurality of common electrodes in a form of a patch,
    wherein the plurality of signal electrodes are in a form of a patch, and
    wherein the plurality of common electrodes and the plurality of signal electrodes are alternately arranged in rows and columns.

10. The display apparatus according to claim 9, wherein the controller is configured to control the voltage applied to the plurality of signal electrodes based on the maximum value among the luminance values of the dimming blocks overlapping each of the plurality of signal electrodes.

11. The display apparatus according to claim 1, wherein the plurality of electrodes are configured to reflect light passing through the electro-optical layer.

12. The display apparatus according to claim 1, wherein the electro-optical layer is configured to change a scattering rate depending on the presence of the electric field.

13. The display apparatus according to claim 1, wherein the electro-optical layer is configured to pass light when the electric field is present, and to scatter the light when the electric field is not present.

* * * * *